United States Patent
Paramasivam

(10) Patent No.: US 10,237,187 B2
(45) Date of Patent: Mar. 19, 2019

(54) SYSTEM AND METHOD FOR SERVICE CHAIN LOAD BALANCING

(71) Applicant: Citrix Systems, Inc., Fort Lauderdale, FL (US)

(72) Inventor: Sankar Muthu Paramasivam, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 281 days.

(21) Appl. No.: 15/143,181

(22) Filed: Apr. 29, 2016

(65) Prior Publication Data

US 2017/0317932 A1 Nov. 2, 2017

(51) Int. Cl.
*H04L 12/803* (2013.01)
*H04L 12/851* (2013.01)
*H04L 29/08* (2006.01)
*G06F 9/50* (2006.01)

(52) U.S. Cl.
CPC .......... *H04L 47/125* (2013.01); *G06F 9/5083* (2013.01); *H04L 47/24* (2013.01); *H04L 67/02* (2013.01)

(58) Field of Classification Search
CPC ....... H04L 47/125; H04L 47/24; H04L 67/02; G06F 9/5083
See application file for complete search history.

(56) References Cited

U.S. PATENT DOCUMENTS

2007/0143460 A1* 6/2007 Ben-David ............. G06F 9/505 709/223
2014/0223573 A1* 8/2014 Reedy ................. G06F 21/6218 726/26
2015/0052247 A1* 2/2015 Threefoot ............... H04L 67/10 709/225
2015/0172170 A1 6/2015 Bosch et al.
2015/0319081 A1* 11/2015 Kasturi ................. H04L 49/355 709/239

(Continued)

FOREIGN PATENT DOCUMENTS

EP 2 963 866 A2 1/2016
EP 3 002 907 A1 4/2016
WO WO-2015/063618 A1 5/2015

OTHER PUBLICATIONS

International Search Report and Written Opinion for PCT Appl. No. PCT/US2017/027271 dated Oct. 9, 2017.

*Primary Examiner* — Lan-Huong Truong
(74) *Attorney, Agent, or Firm* — Foley & Lardner LLP; Christopher J. McKenna

(57) ABSTRACT

The present disclosure is directed towards systems and methods of service chain load balancing. A controller intermediary to a client and computing infrastructure identifies a plurality of service chains. Each of the plurality of service chains include a path having an instance of a first service provided by the computing infrastructure and an instance of a second service provided by the computing infrastructure. The controller determines a path weight for each of the plurality of service chains. The path weight indicates a level of efficiency of delivering services in accordance with the service chain. The controller selects, based on a load balancing function and the path weight for each of the plurality of service chains, a service chain from the plurality of service chains to direct network traffic from a client.

18 Claims, 22 Drawing Sheets

(56) References Cited

U.S. PATENT DOCUMENTS

| | | | |
|---|---|---|---|
| 2015/0341377 A1* | 11/2015 | Kasturi | H04L 63/1416 726/23 |
| 2015/0365324 A1 | 12/2015 | Kumar et al. | |
| 2016/0014126 A1* | 1/2016 | Jalan | H04L 63/0892 726/7 |
| 2016/0241436 A1* | 8/2016 | Fourie | H04L 47/2425 |
| 2016/0337202 A1* | 11/2016 | Ben-Itzhak | H04L 45/745 |
| 2017/0053015 A1* | 2/2017 | Liongosari | G06F 17/30598 |

* cited by examiner

SYSTEM AND METHOD FOR SERVICE CHAIN LOAD BALANCING

FIELD OF THE DISCLOSURE

The present application generally relates to a load balancing service chains in a computing infrastructure. In particular, the present application relates to systems and methods for load balancing service chains using metadata related to instances of the service chains.

BACKGROUND OF THE DISCLOSURE

A client device can access or use an application, service, or infrastructure provided via a cloud environment including one or more servers. The client device can access the cloud environment or one or more servers via an intermediary device that is intermediary to the client device and the servers. However, instances of services may be distributed across multiple regions or availability zones in a cloud environment. It may be challenging to efficiently provide services for instances that are distributed across the cloud environment because the distribution of instances can impact overhead, cost, latency, throughput, or load.

BRIEF SUMMARY OF THE DISCLOSURE

The present disclosure is directed towards systems and methods for managing cloud-based services via a network. In computing infrastructure comprising one or more processors or servers in one or more networked environments, instances of services may be distributed across multiple regions, availability zones, and more. A computing infrastructure can include a cloud environment such as an infrastructure as a service (IaaS) environment, software as a service (SaaS) environment, or platform as a service (PaaS) environment. An IaaS environment can refer to cloud computing where shared computing resources, data and information are provided to computing devices on-demand.

The computing infrastructure can include a multihop processing deployment (e.g. service chaining). In multihop processing deployments, each hop can be a load balancing system. However, load balancing at every hop level or service node level may not result in global optimal multihop processing. Systems and methods of the present disclosure can identify a global view of the multihop deployment, analyze all possible paths, identify optimal paths, and load balance traffic across the identified optimal paths. Thus, systems and methods of the present disclosure can improve the performance of the computing infrastructure by using globally optimal service chain load balancing.

A device intermediary to the servers of the cloud environment and client devices, such as an application delivery controller (ADC), can facilitate providing or delivering the services provided by the cloud environment. A controller of the present disclosure can query a cloud application programming interface (API), such as an IaaS API, to discover or determine metadata corresponding to instances of the services provided by the IaaS cloud. The metadata can include account information associated with a provider of the cloud environment, such as a distribution, available resources, or resource consumption. The controller can use this metadata to automatically tune features or functionalities of an application delivery controller, thus bringing cloud awareness into the ADC systems. Using metadata associated with a cloud environment allows the controller to more efficiently provide services for instances that are distributed across the cloud environment by reducing overhead, cost, latency, throughput, or load.

For example, hosted systems in public or private cloud environments can include one or more APIs to identify or determine cloud partitions or boundaries. The APIs allows the hosted system or systems that interface with the hosted system to monitor internal dynamism to identify the environmental impact on overhead, cost, latency, throughput, or load. Once the system is aware of the infrastructure and its dynamism by using the available metadata, the system can automatically tune itself such that the system is more suitable to the cloud environment, and can perform more efficiently. Thus, systems and methods of the present disclosure can: 1) identify cloud partitions/boundaries; 2) monitor the internal dynamism in the cloud; 3) determine the cloud/environmental impact on the system; and 4) tune the hosted system to adapt to the environmental variables.

Providers of private or public cloud infrastructure (e.g., a cloud environment) can maintain an informational store or data repository that includes account information for customers of the cloud infrastructure. The system can use this information store as a database to track of user account information and their resource allocations for billing, maintenance, analysis, or other purposes. Cloud APIs can be configured to query the database. Using these APIs the system can fetch metadata about instances, including fetching the instances' placement in the cloud, resource allocation (CPU, memory, bandwidth), type of reservation, type of connectivity, or other attributes or characteristics associated with the instance.

An ADC can use the retrieved metadata to perform load balancing operations. For example, the ADC can receive data packets or network traffic from a client and forward the data packets to a destination. One or more services may process the network data or data packets to reach the destination. Services can include, e.g., firewalls, authentication, intrusion detection system, web services, etc. The ADC can use the metadata to identify instances of the plurality of services in the computing infrastructure. In some cases, the instances can be grouped or linked together to form a path, which can be referred to as a service chain. For example, the service chain can have a path that includes an instance of the firewall, an instance of the intrusion detection system, and an instance of the web services.

The ADC can use the metadata to perform service chain load balancing. For example, rather than perform load balancing at a service node level (e.g., at instance of each service), the ADC can determine an edge weight for each instance of the service chain, combine the edge for each instance of each service chain to determine a path weight for the service chain, and then select the service chain based on the path weight. Thus, the ADC can tune the cloud environment to reduce load on the computing infrastructure, reduce network overhead, reduce cost and provide improved load balancing service.

For example, the system can be configured with a control plane daemon that periodically fetches some or all instances of services of service chains provided via the cloud environment, and meta-data or account information related to the instances. The system can analyze the meta-data and identify, generate, or determine edge weights for each instance of the service chain, and a path weight for each service chain. The weights can indicate or refer to a logical measurement of performance of the cloud infrastructure. The path weight can be used with various load-balancing (LB) algorithms (e.g., as weighted LB algorithm) to achieve improved system performance.

At least one aspect is directed to a method of load balancing service chains. The method can include a controller identifying a plurality of service chains that each include a path having an instance of a first service provided by the computing infrastructure and an instance of a second service provided by the computing infrastructure. The controller can be intermediary to a client and computing infrastructure. The computing infrastructure can include one or more servers in one or more networked environments. The method can include the controller determining a path weight for each of the plurality of service chains. The path weight can indicate a level of efficiency of delivering services in accordance with the service chain. The method can include the controller selecting a service chain from the plurality of service chains to direct network traffic from a client. The controller can select the service chain based on a load balancing function and the path weight for each of the plurality of service chains.

In some embodiments, the controller can generate, using a cloud application programming interface, one or more queries to retrieve metadata for each instance of the plurality of service chains, the one or more queries configured to retrieve information for at least one of a placement, resource allocation, type of reservation, or type of connectivity. In some embodiments, the controller can identify the plurality of service chains using the one or more queries to identify each instance of the plurality of service chains. Responsive to the one or more queries, the controller can receive an indication of a first service chain comprising a first path. The first path can have a first instance of the first service and a first instance of the second service. The controller can also receive an indication of a second service chain comprising a second path. The second path can have a second instance of the first service and a second instance of the second service.

In some embodiments, the controller can identify the service chain of the plurality of service chains comprising a first path having a first instance of the first service and a first instance of the second service. The controller can identify a second service chain of the plurality of service chains comprising a second path having a second instance of the first service and a second instance of the second service. The controller can receive, using a cloud application programming interface, metadata for each of the first instance of the first service, the second instance of the first service, the first instance of the second service, and the second instance of the second service. The controller can determine, based on the metadata, a first edge weight for the first instance of the first service, a second edge weight for the second instance of the first service, a third edge weight for the first instance of the second service, and a fourth edge weight for the second instance of the second service. The controller can generate a first path weight for the first path based on a combination of the first edge weight with the third edge weight. The controller can generate a second path weight for the second path based on a combination of the second edge weight with the fourth edge weight. The controller can select the service chain corresponding to the first path based on the first path weight ranking higher than the second path weight.

In some embodiments, the controller can select the service chain by ranking each service chain of the plurality of service chains based on the path weight for each of the plurality of service chains. The controller can select, based on the ranking, a predetermined number of highest ranking service chains of the plurality of service chains to generate a subset of service chains. The controller can input the path weight for each of the subset of service chains into the load balancing function to select the service chain.

In some embodiments, the controller can rank each service chain of the plurality of service chains based on the path weight for each of the plurality of service chains. The controller can select, based on the ranking, a predetermined number of highest ranking service chains of the plurality of service chains to generate a subset of service chains. The controller can identify one or more instances of the first service that are missing from the subset of service chains. The controller can modify the subset of service chains to include one or more additional service chains of the plurality of service chains. The one or more additional service chains can include the one or more instances of the first service.

In some embodiments, the controller can use a machine learning technique to prune the plurality of service chains to generate a subset of the plurality of service chains. The controller can select, based on the load balancing function and the path weight for each of the subset of the plurality of service chains, the service chain from the subset of the plurality of service chains.

In some embodiments, the controller can determine the path weight for each of the plurality of service chains based on an edge weight of each instance of each of the plurality of service chains. The path weight can be based on at least one of latency, resource overhead, throughput, or resource cost. In some embodiments, each of the plurality of service chains comprise a different path and provide same services. In some embodiments, the controller forwards network traffic from the client to the first instance of the selected service chain.

Another aspect is directed to a system to load balance service chains. The system can include a controller intermediary to a client and computing infrastructure. The computing infrastructure can include one or more servers in one or more networked environments. The controller can be configured to identify a plurality of service chains that each include a path. Each of the paths can have an instance of a first service provided by the computing infrastructure and an instance of a second service provided by the computing infrastructure. The controller can determine a path weight for each of the plurality of service chains. The path weight can indicate a level of efficiency of delivering services in accordance with the service chain. The controller can select, based on a load balancing function and the path weight for each of the plurality of service chains, a service chain from the plurality of service chains to direct network traffic from a client.

In some embodiments, the controller can generate, based on a cloud application programming interface, one or more queries to identify each instance of the plurality of service chains. The controller can receive, responsive to the one or more queries, an indication of a first service chain comprising a first path having a first instance of the first service and a first instance of the second service. The controller can receive an indication of a second service chain comprising a second path having a second instance of the first service and a second instance of the second service.

In some embodiments, the controller can generate, based on a cloud application programming interface, one or more queries to retrieve metadata for each instance of the plurality of service chains, the one or more queries configured to retrieve information for at least one of a placement, resource allocation, type of reservation, or type of connectivity.

In some embodiments, the controller can identify the service chain of the plurality of service chains comprising a first path having a first instance of the first service and a first instance of the second service. The controller can identify a second service chain of the plurality of service chains comprising a second path having a second instance of the first service and a second instance of the second service. The controller can receive, via a cloud application programming interface, metadata for each of the first instance of the first service, the second instance of the first service, the first instance of the second service, and the second instance of the second service. The controller can determine, based on the metadata, a first edge weight for the first instance of the first service, a second edge weight for the second instance of the first service, a third edge weight for the first instance of the second service, and a fourth edge weight for the second instance of the second service. The controller can generate a first path weight for the first path based on a combination of the first edge weight with the third edge weight. The controller can generate a second path weight for the second path based on a combination of the second edge weight with the fourth edge weight. The controller can select the service chain corresponding to the first path based on the first path weight ranking higher than the second path weight.

In some embodiments, the controller can rank each service chain of the plurality of service chains based on the path weight for each of the plurality of service chains. The controller can select, based on the rank, a predetermined number of highest ranking service chains of the plurality of service chains to generate a subset of service chains. The controller can input the path weight for each of the subset of service chains into the load balancing function to select the service chain.

In some embodiments, the controller can rank each service chain of the plurality of service chains based on the path weight for each of the plurality of service chains. The controller can select, based on the rank, a predetermined number of highest ranking service chains of the plurality of service chains to generate a subset of service chains. The controller can identify one or more instances of the first service that are missing from the subset of service chains. The controller can modify the subset of service chains to include one or more additional service chains of the plurality of service chains. The one or more additional service chains can include the one or more instances of the first service.

In some embodiments, the controller can prune, based on a machine learning technique, the plurality of service chains to generate a subset of the plurality of service chain. The controller can select, based on the load balancing function and the path weight for each of the subset of the plurality of service chains, the service chain from the subset of the plurality of service chains. In some embodiments, the controller can determine the path weight for each of the plurality of service chains based on an edge weight of each instance of each of the plurality of service chains, the path weight based on at least one of latency, resource overhead, throughput, or resource cost. Each of the plurality of service chains can include a different path and provide same services. The controller can forward network traffic from the client to the first instance of the selected service chain.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
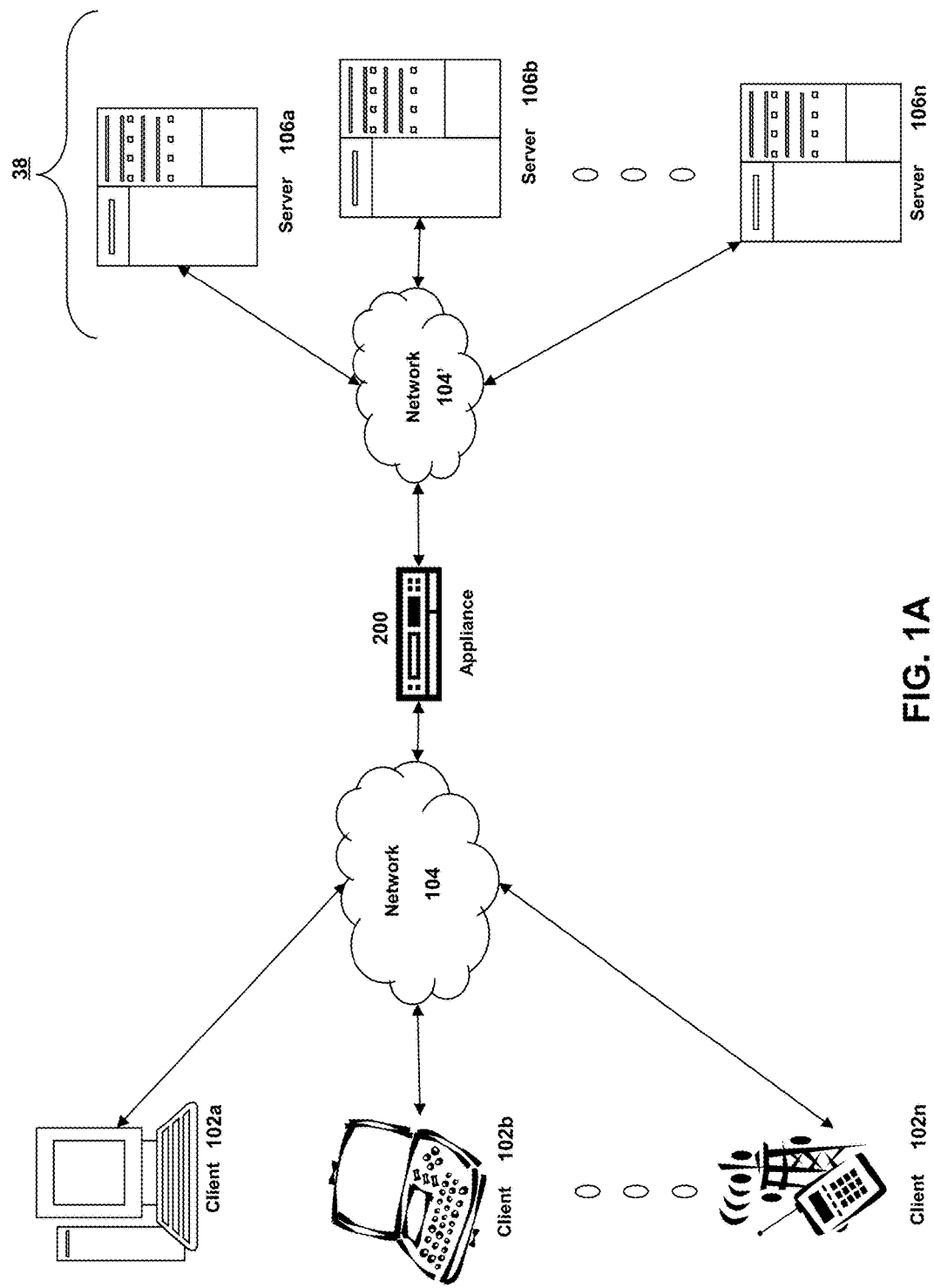
FIG. 1A is a block diagram of an embodiment of a network environment for a client to access a server via an appliance.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for providing a clustered appliance architecture environment; and Section G describes embodiments of systems and methods for load balancing service chains via a network.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as NetScaler® devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
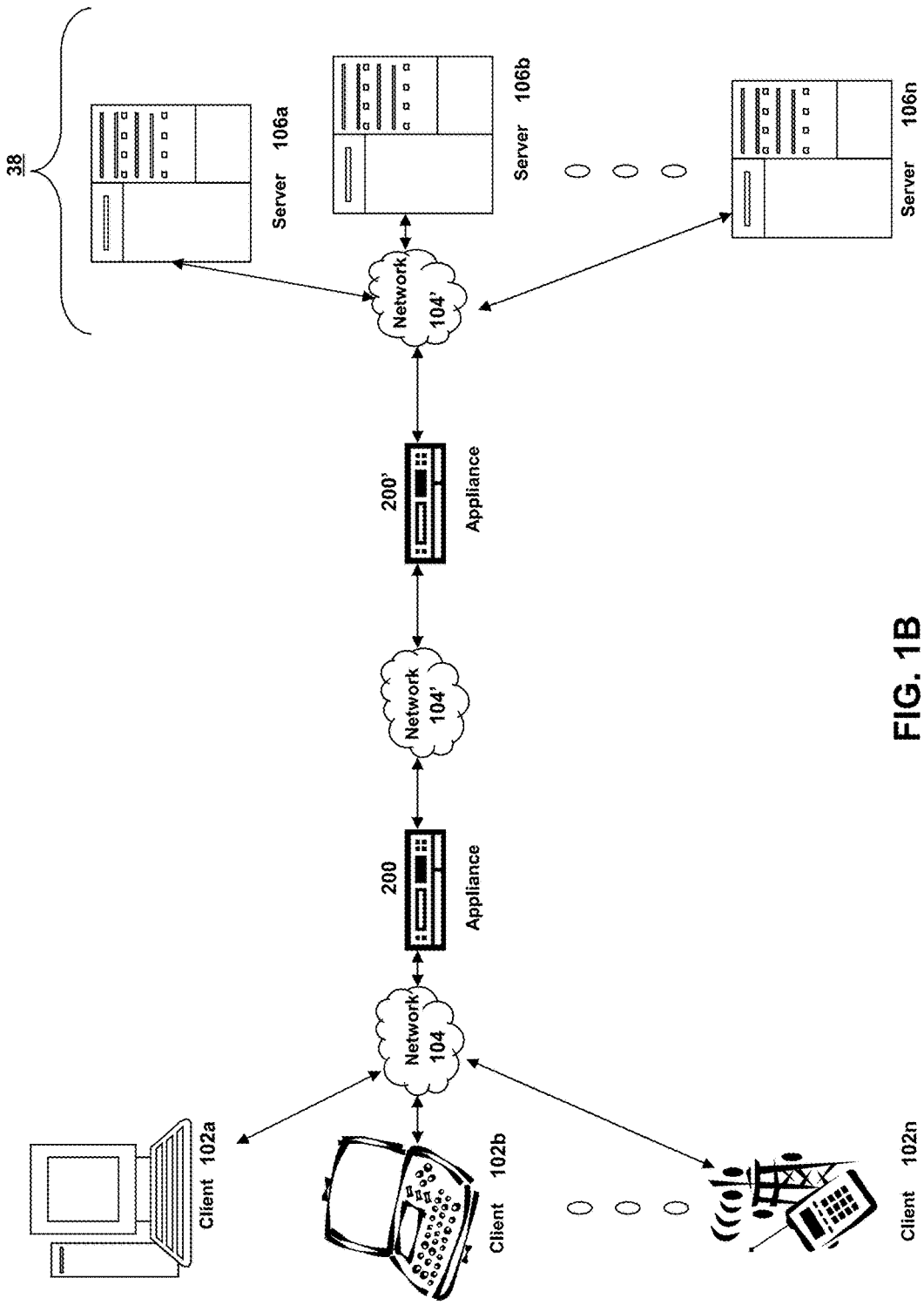
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as CloudBridge® manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1C:
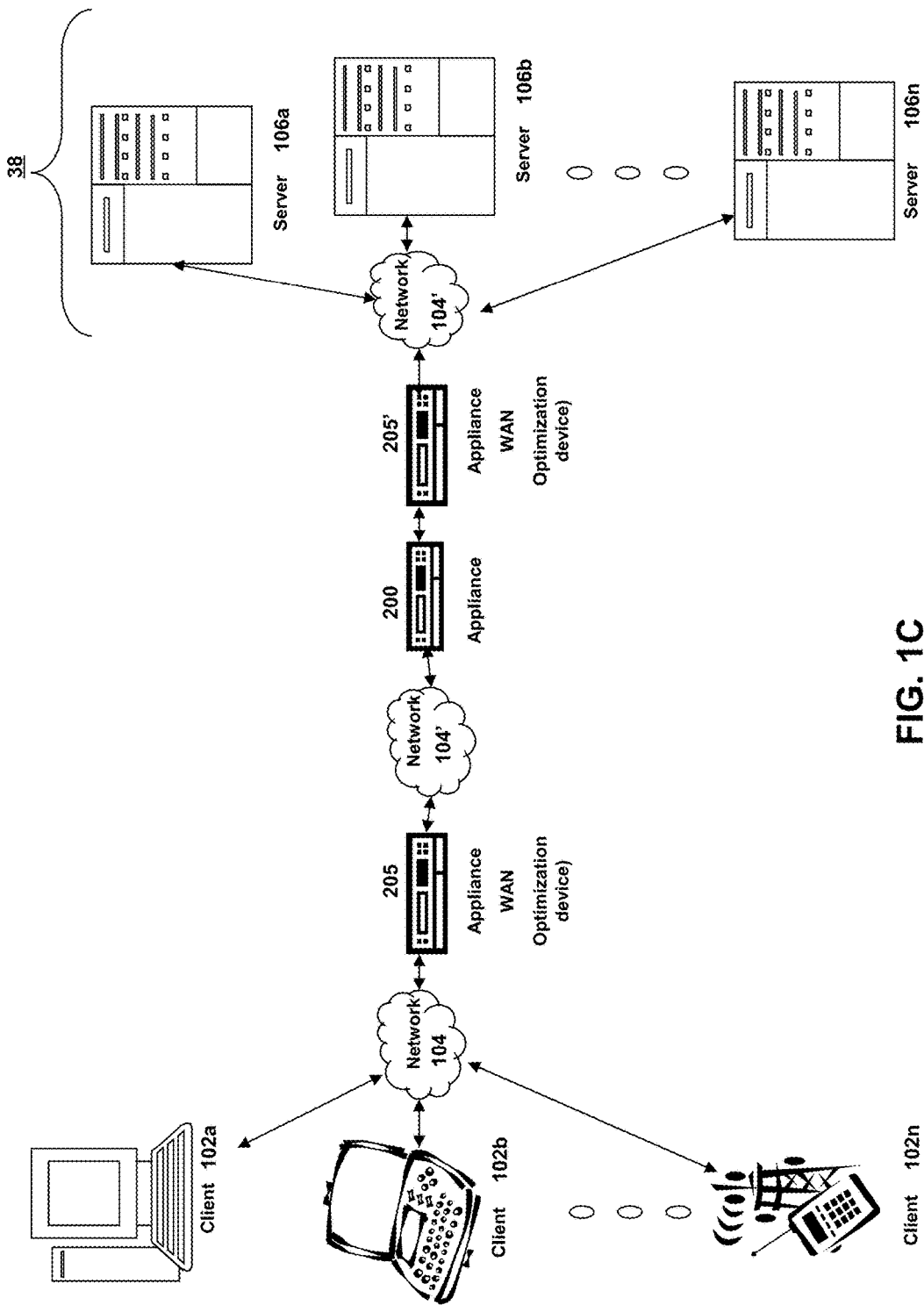
FIG. 1C is a block diagram of another embodiment of an environment for delivering a computing environment from a server to a client via an appliance.
Figure 1D:
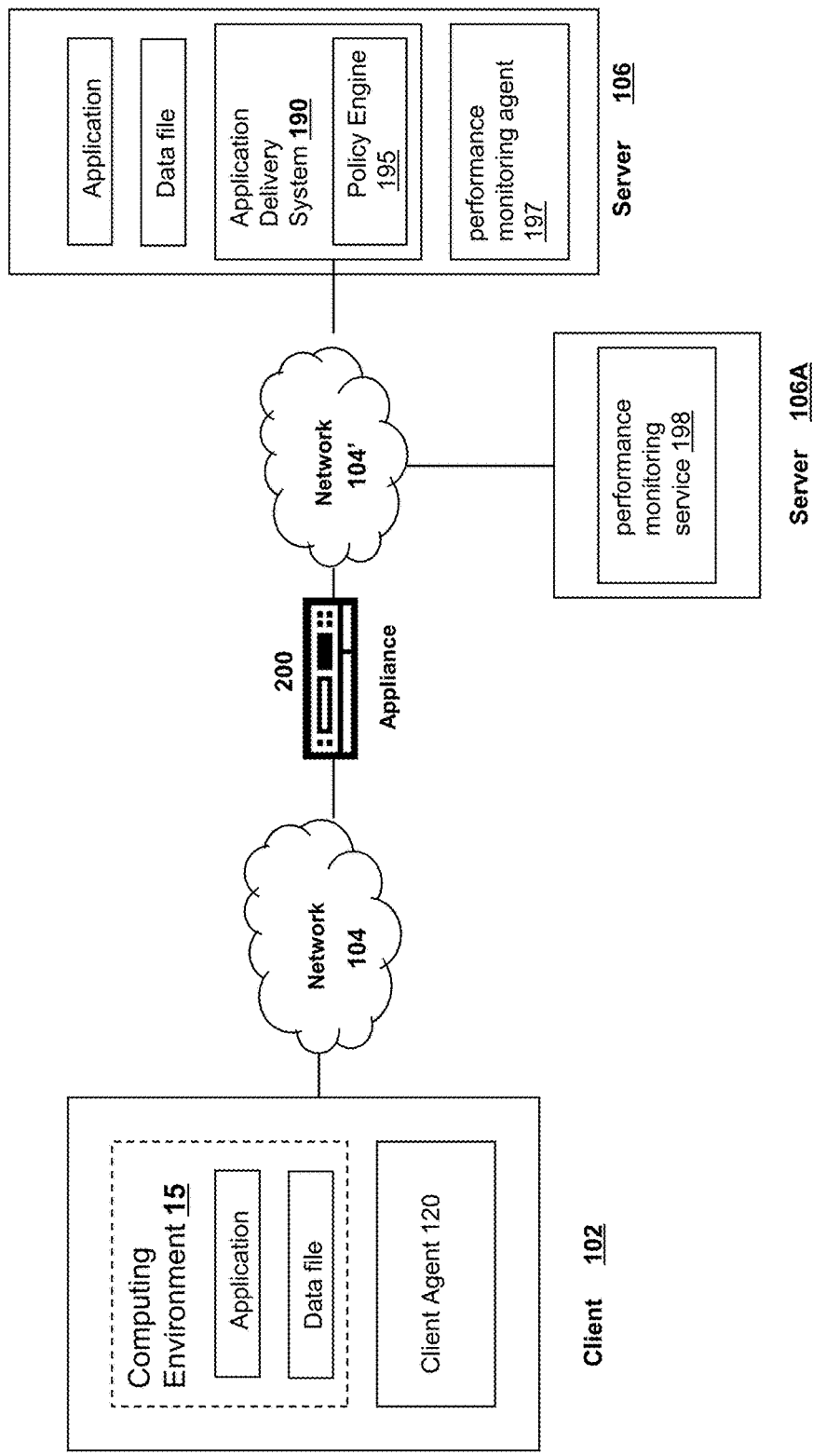
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Workspace Suite™ by Citrix Systems, Inc., such as XenApp® or XenDesktop® and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Workspace Suite™ by Citrix Systems, Inc., such as XenApp® or XenDesktop®, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Systems, Inc. of Fort Lauderdale, Fla., WebEx™ provided by Cisco Systems, Inc. of San Jose, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
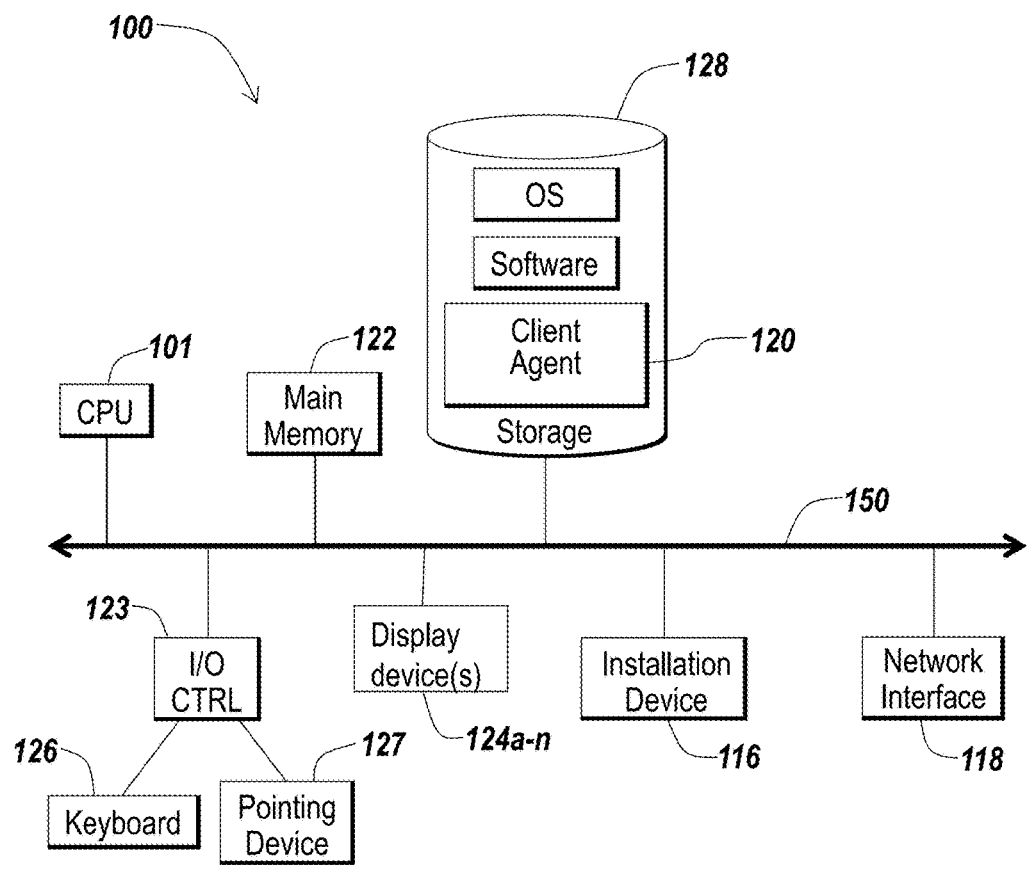
FIGS. 1E-1H are block diagrams of embodiments of a computing device.
Figure 1F:
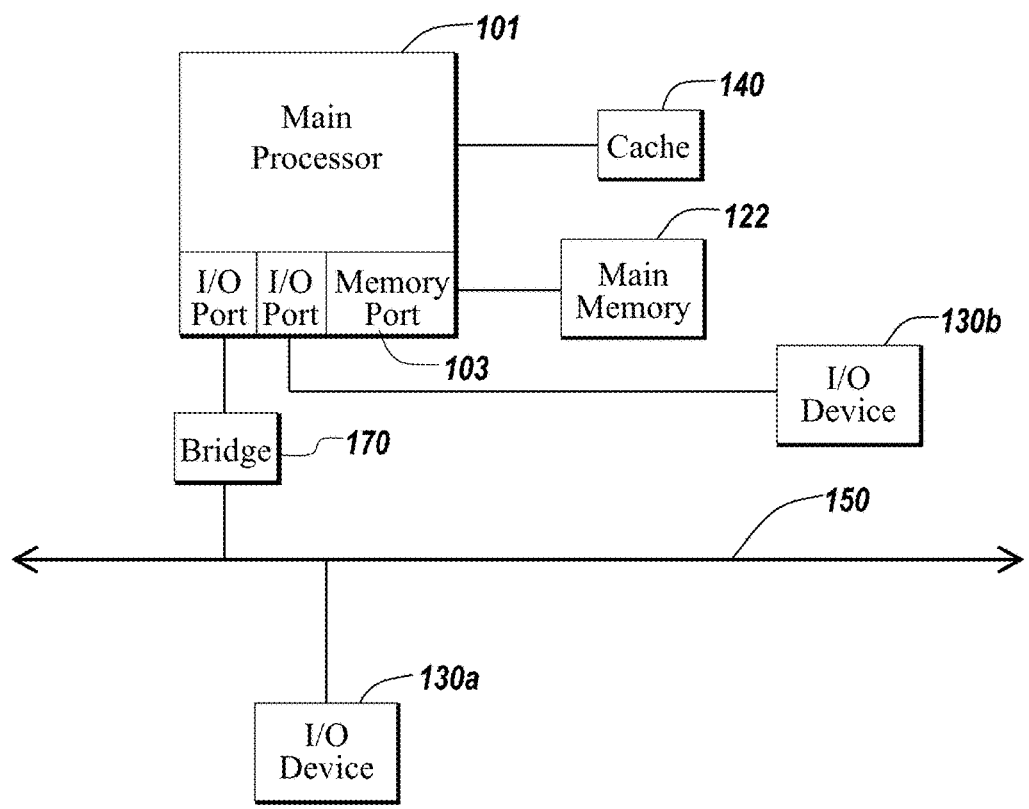

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130*b* via HyperTransport, Rapid I/O, or InfiniBand. FIG. 1F also depicts an embodiment in which local busses and direct communication are mixed: the processor 101 communicates with I/O device 130*b* using a local interconnect bus while communicating with I/O device 130*a* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
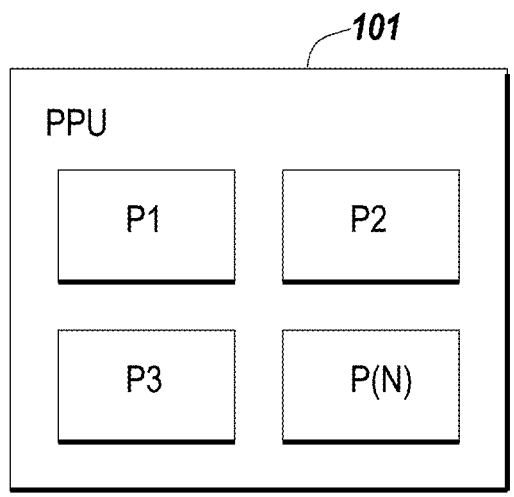

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
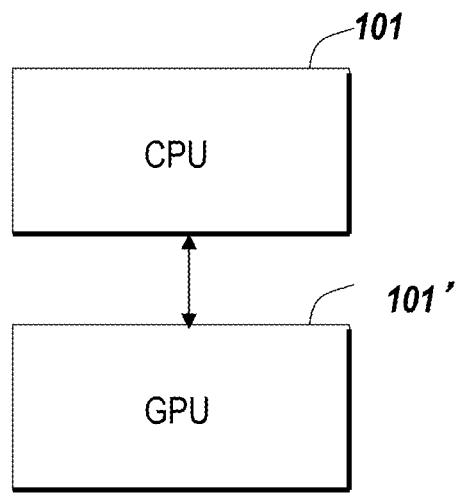

In some embodiments, the computing device 100 may comprise a graphics processing unit. In one of these embodiments depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
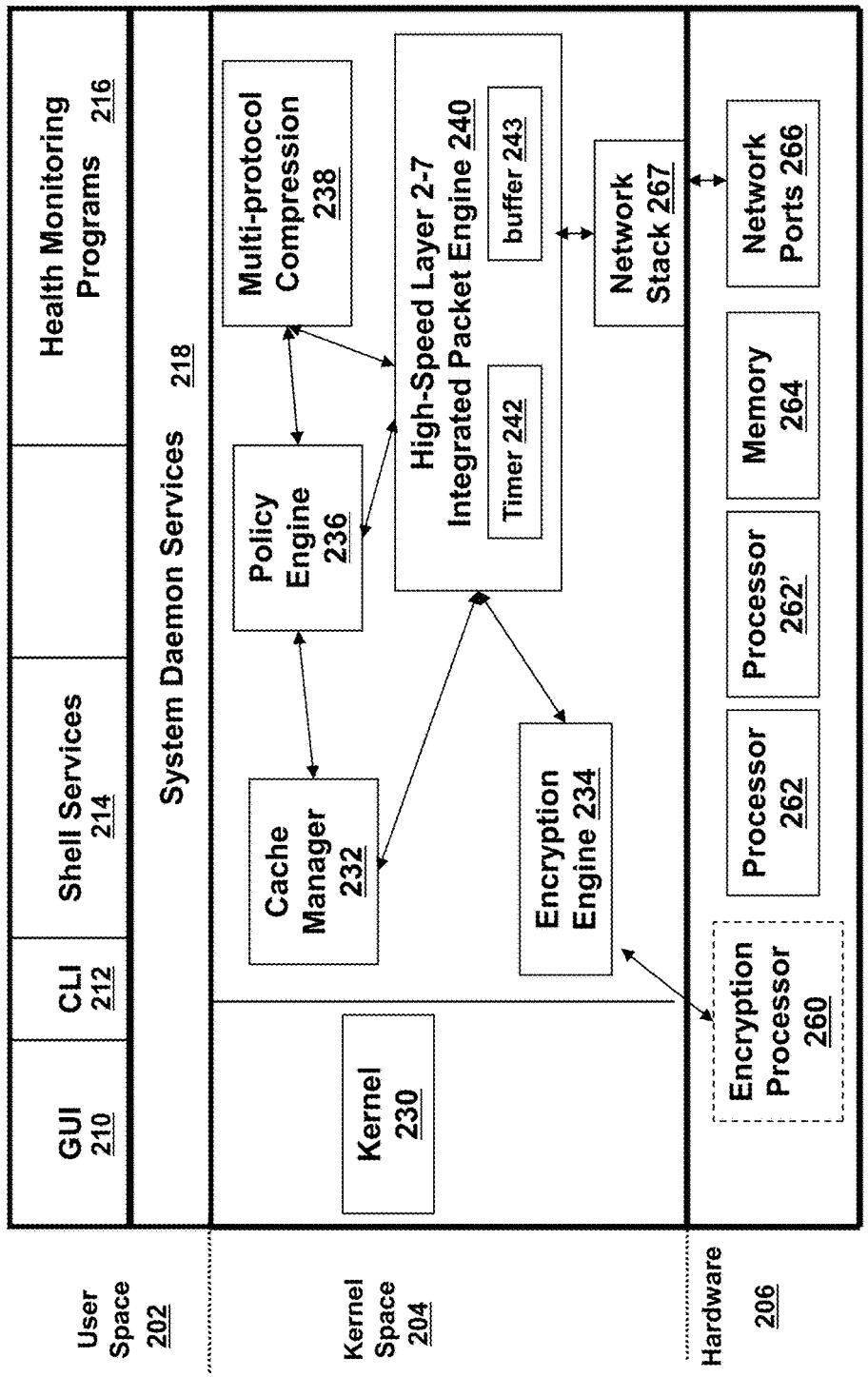
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
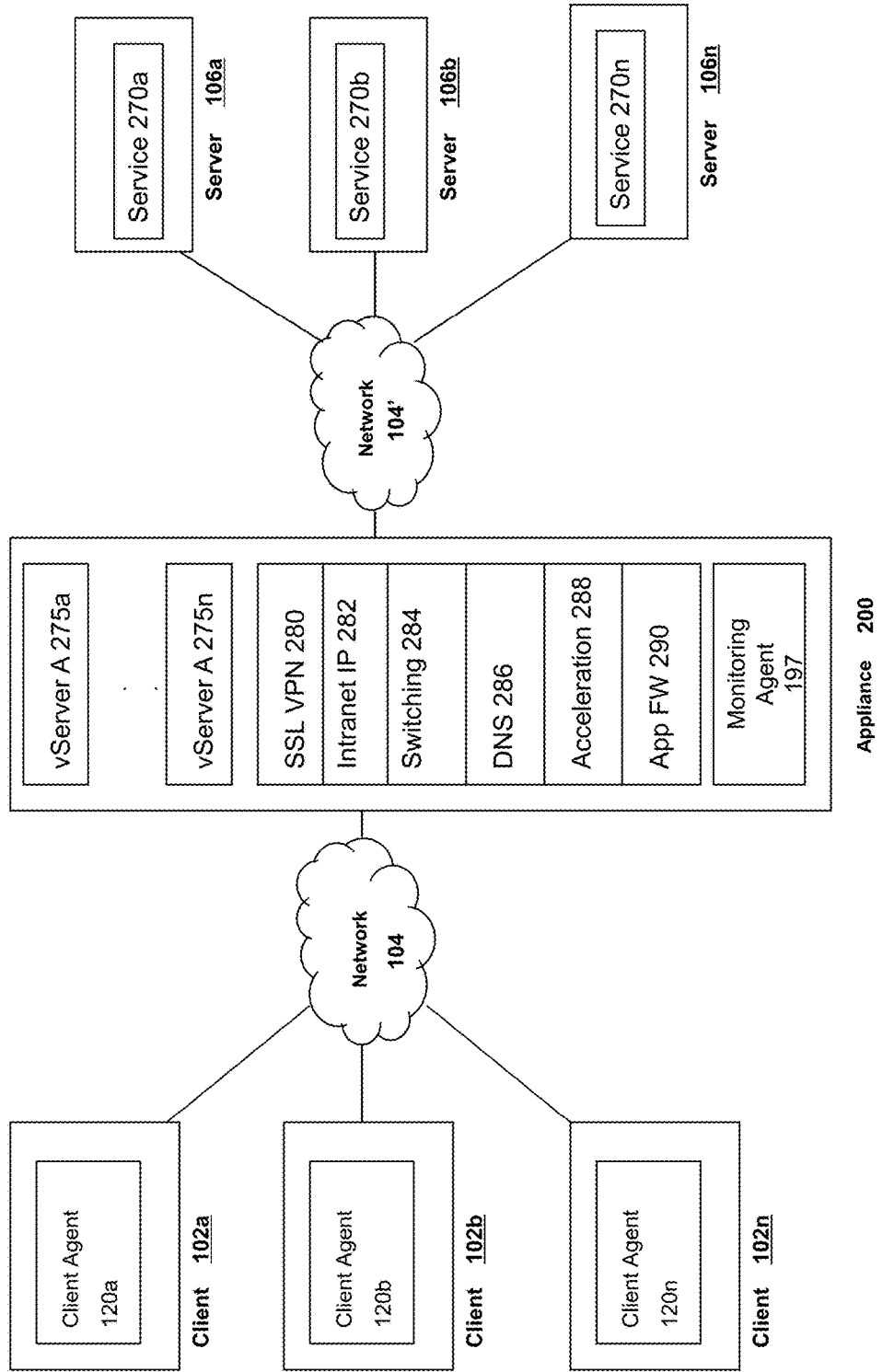
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
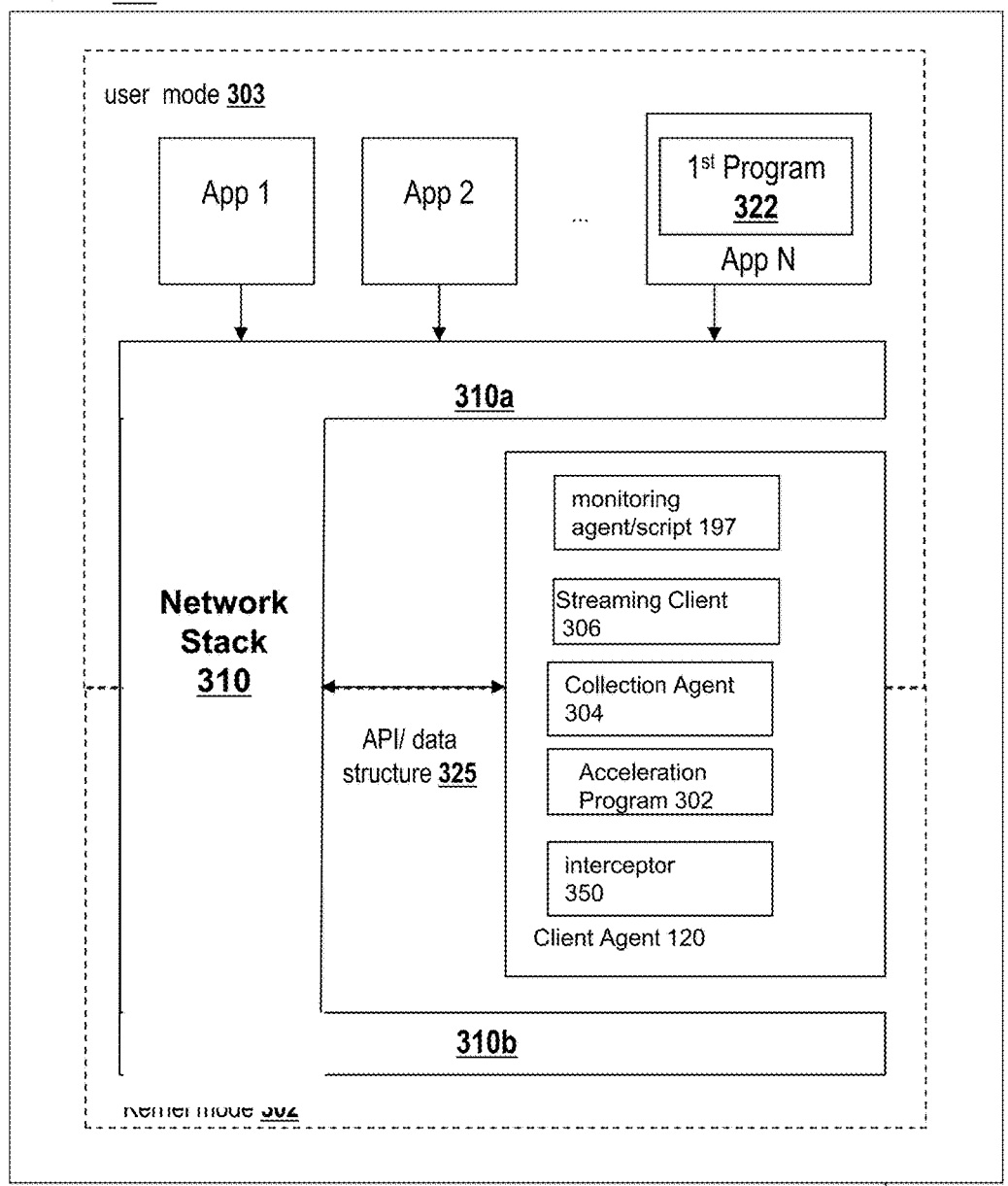
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system and/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
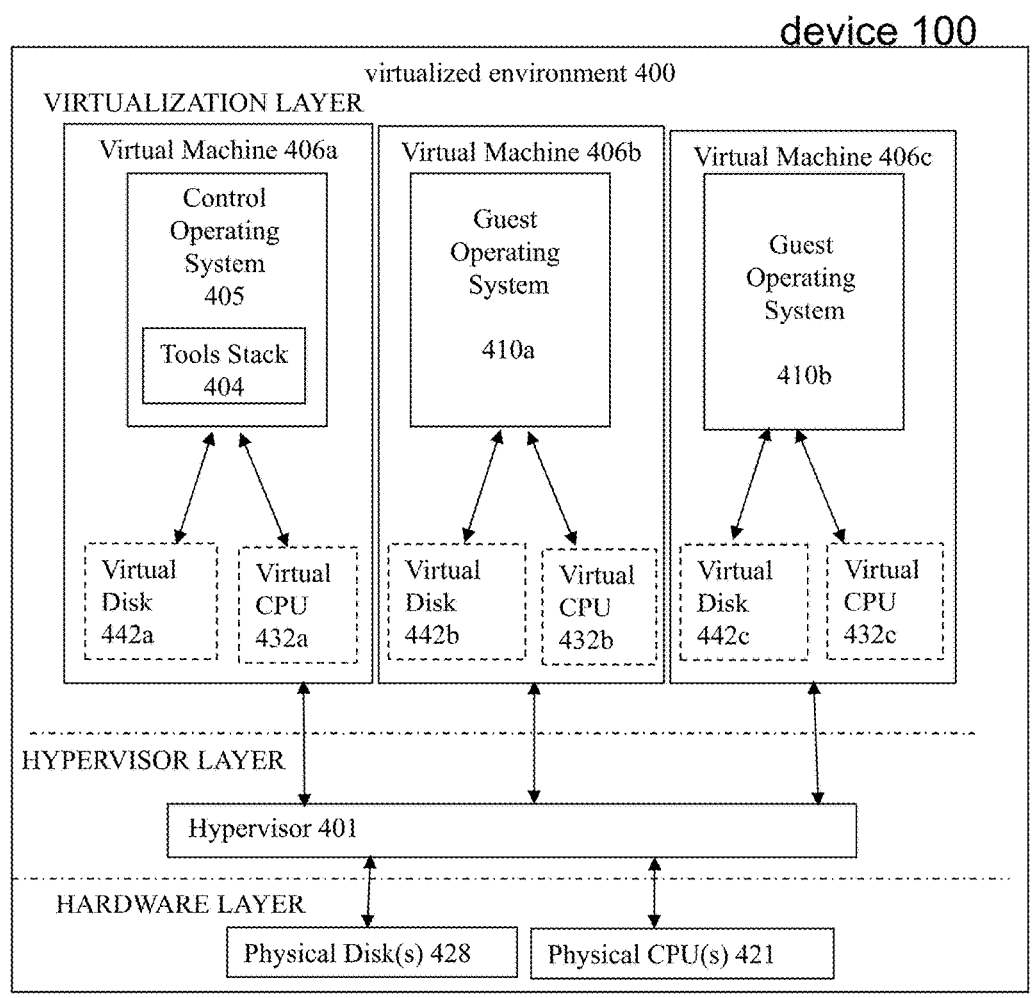
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
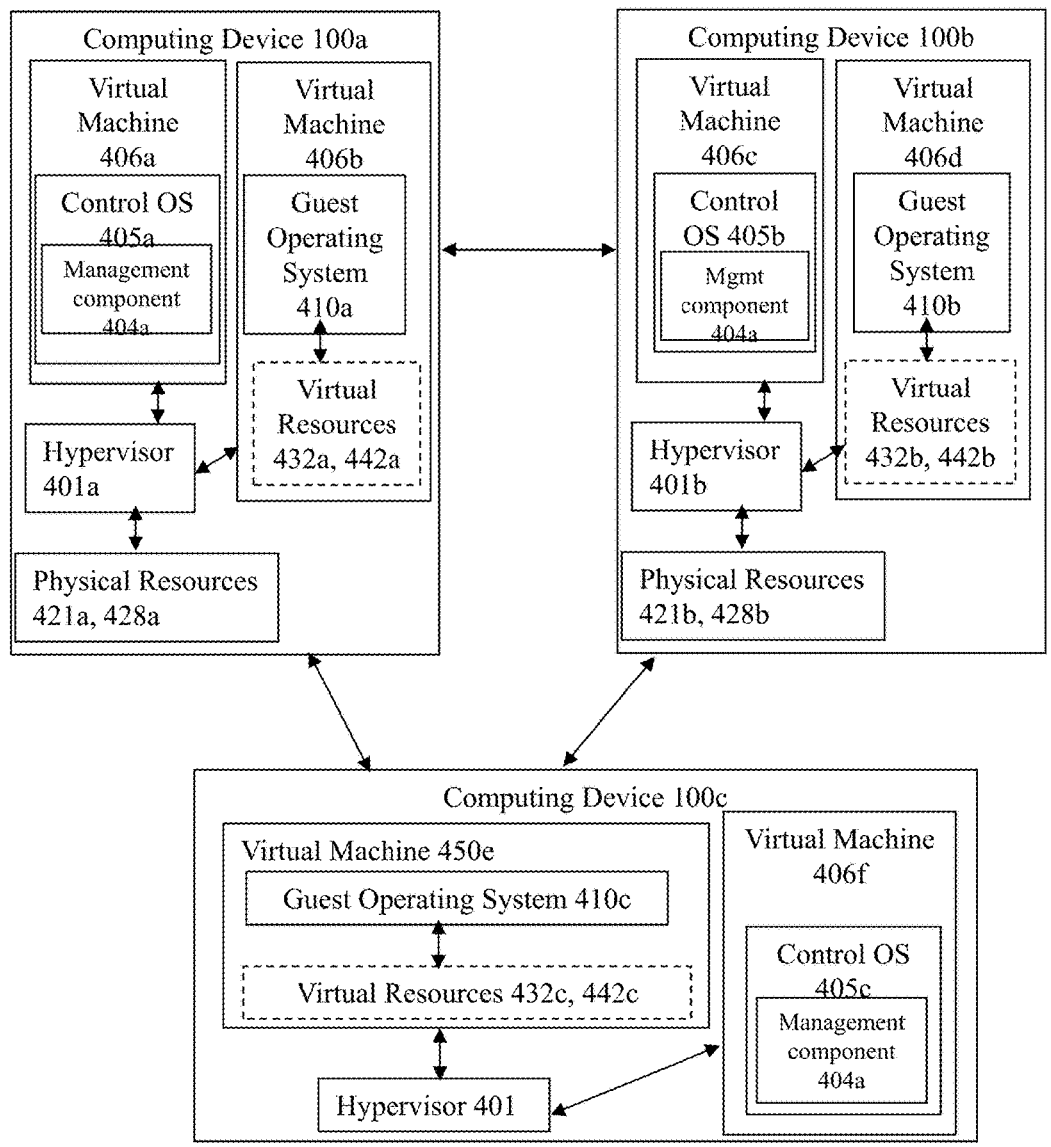
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
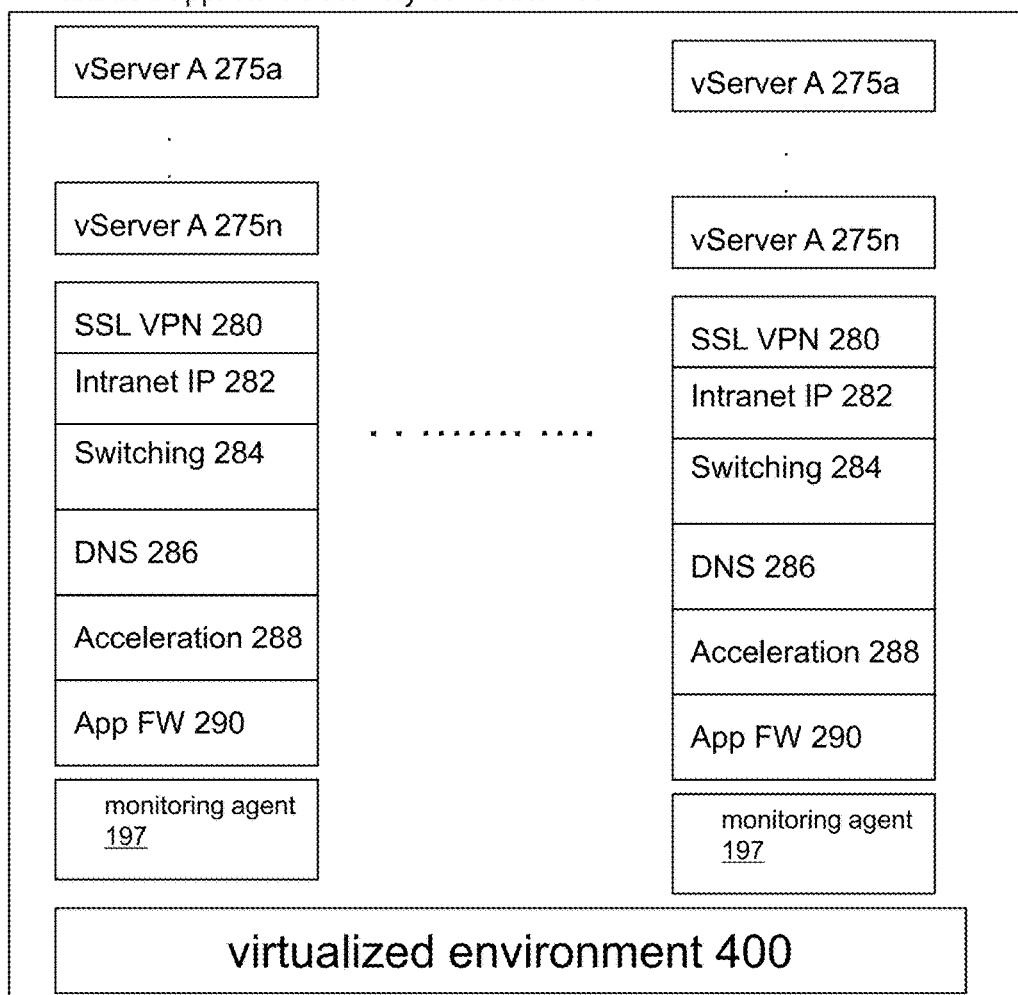
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 290 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

In some embodiments, a system can perform work, task, load or network traffic distribution across one or more processor cores according to a type of parallelism or parallel computing scheme, such as functional parallelism, data parallelism or flow-based data parallelism. For example, embodiments of a multi-core system such as an appliance 200' with n-cores, can include a total of cores numbers 1 through N shown in FIG. 5. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

Figure 5:
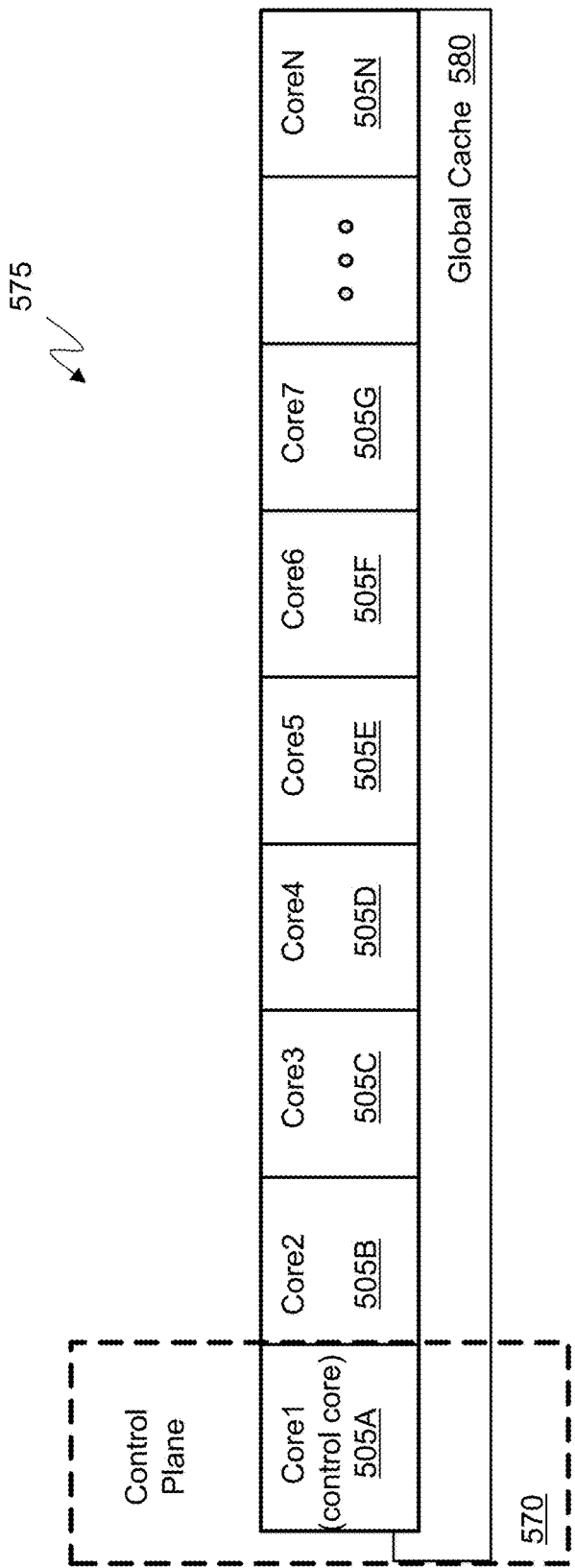
FIG. 5 is a block diagram of another embodiment of an aspect of a multi-core system.

In further detail to FIG. 5, in some embodiments, load, work or network traffic can be distributed among cores 505 according to functional parallelism. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism, can comprise distributing network traffic according to a particular function such as network input/output management (NW I/O), secure sockets layer (SSL) encryption and decryption and transmission control protocol (TCP) functions. This may lead to a work, performance or computing load based on a volume or level of functionality being used. In some embodiments, distributing work across the cores 505 according to data parallelism, can comprise distributing an amount of work based on distributing data associated with a particular hardware or software component. In some embodiments, distributing work across the cores 505 according to flow-based data parallelism, can comprise distributing data based on a context or flow such that the amount of work on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases division by function may lead to different cores running at different levels of performance or load.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, division by function may lead to different cores running at different levels of load or performance.

The functionality or tasks may be distributed in any arrangement and scheme. For example, a first core, Core 1 505A, can perform processing applications and processes associated with network I/O functionality. Network traffic associated with network I/O, in some embodiments, can be associated with a particular port number. Thus, outgoing and incoming packets having a port destination associated with NW I/O will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

Functions such as network I/O, SSL and TCP, or other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

A single vServer can be associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 and NIC2. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores, or varying loads.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism, distribution of data is related to any type of flow of data, such as request/response pairings, transactions, sessions, connections or application communications. For example, network traffic between a client and a server traversing the appliance may be distributed to and processed by one core of the plurality of cores.

In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load on Core 1 is less than the load on the rest of the cores 505B-N. Once the first data packet is allocated to Core 1 505A, the amount of load on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes can be combined in any manner to generate a hybrid parallelism or distributed processing scheme that encompasses function parallelism, data parallelism, flow-based data parallelism or any portions thereof. In some cases, the multi-core system may use any type and form of load balancing schemes to distribute load among the one or more cores 505. The load balancing scheme may be used in any combination with any of the functional and data parallelism schemes or combinations thereof.

An embodiment of a multi-core system may be any type and form of one or more systems, appliances, devices or components. This system, in some embodiments, can be included within an appliance 200 having one or more processing cores 505A-N. The system can further include one or more packet engines (PE) or packet processing engines (PPE) communicating with a memory bus. The memory bus may be used to communicate with the one or more processing cores 505A-N. Also included within the system can be one or more network interface cards (NIC) and a flow distributor which can further communicate with the one or more processing cores 505A-N. The flow distributor can comprise a Receive Side Scaler (RSS) or Receive Side Scaling (RSS) module.

In one embodiment the packet engine(s) can comprise any portion of the appliance 200 described herein, such as any portion of the appliance described in FIGS. 2A and 2B. The packet engine(s) can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus or the one of more cores 505A-N. In some embodiments, the packet engine(s) can comprise one or more vServers 275A-N, or any portion thereof. In other embodiments, the packet engine(s) can provide any combination of the following functionalities: SSL VPN 280; Intranet UP 282; switching 284; DNS 286; packet acceleration 288; App FW 290; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) can, in some embodiments, be associated with a particular server, user, client or network. When a packet engine becomes associated with a particular entity, that packet engine can process data packets associated with that entity. For example, should a packet engine be associated with a first user, that packet engine will process and operate on packets generated by the first user, or packets having a destination address associated with the first user. Similarly, the packet engine may choose not to be associated with a particular entity such that the packet engine can process and otherwise operate on any data packets not generated by that entity or destined for that entity.

In some instances, the packet engine(s) can be configured to carry out the any of the functional and/or data parallelism schemes. In these instances, the packet engine(s) can distribute functions or data among the processing cores 505A-N so that the distribution is according to the parallelism or distribution scheme. In some embodiments, a single packet engine(s) carries out a load balancing scheme, while in other embodiments one or more packet engine(s) carry out a load balancing scheme. Each core 505A-N, in one embodiment, can be associated with a particular packet engine such that load balancing can be carried out by the packet engine. Load balancing may in this embodiment, require that each packet engine associated with a core 505 communicate with the other packet engines associated with cores so that the packet engines can collectively determine where to distribute load. One embodiment of this process can include an arbiter that receives votes from each packet engine for load. The arbiter can distribute load to each packet engine based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus can be any type and form of memory or computer bus. The system can comprise any number of memory buses. In one embodiment, each packet engine can be associated with one or more individual memory buses.

The NIC can in some embodiments be any of the network interface cards or mechanisms described herein. The NIC can have any number of ports. The NIC can be designed and constructed to connect to any type and form of network 104. The system can comprise any number of NICs. In some embodiments, each core 505A-N can be associated with one or more single NICs. Thus, each core 505 can be associated with a single NIC dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5 illustrates seven cores 505A-G, any number of cores 505 can be included within the system. In particular, the system can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Any of the functionality and/or embodiments of the cores 505 described above in connection with FIG. 5 can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiments, the cores 505 may comprise any portion of any processor described herein. While FIG. 5 illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor can be any application, program, library, script, task, service, process or any type and form of executable instructions executing on any type and form of hardware. In some embodiments, the flow distributor may any design and construction of circuitry to perform any of the operations and functions described herein. In some embodiments, the flow distributor distribute, forwards, routes, controls and/or manage the distribution of data packets among the cores 505 and/or packet engine or VIPs running on the cores. The flow distributor, in some embodiments, can be referred to as an interface master. In one embodiment, the flow distributor comprises a set of executable instructions executing on a core or processor of the appliance 200. In another embodiment, the flow distributor comprises a set of executable instructions executing on a computing machine in communication with the appliance 200. In some embodiments, the flow distributor comprises a set of executable instructions executing on a NIC, such as firmware. In still other embodiments, the flow distributor comprises any combination of software and hardware to distribute data packets among cores or processors. In one embodiment, the flow distributor executes on at least one of the cores 505A-N, while in other embodiments a separate flow distributor assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system comprises one or more flow distributors, each flow distributor can be associated with a processor 505 or a packet engine. The flow distributors can comprise an interface mechanism that allows each flow distributor to communicate with the other flow distributors executing within the system. In one instance, the one or more flow distributors can determine how to balance load by communicating with each other. This process can operate substantially similarly to the process described above for submitting votes to an arbiter which then determines which flow distributor should receive the load. In other embodiments, a first flow distributor can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor can distribute network traffic among the cores 505 according to a distribution, computing or load balancing scheme such as those described herein. In one embodiment, the flow distributor can distribute network traffic according to any one of a functional parallelism distribution scheme, a data parallelism load distribution scheme, a flow-based data parallelism distribution scheme, or any combination of these distribution scheme or any load balancing scheme for distributing load among multiple processors. The flow distributor can therefore act as a load distributor by taking in data packets and distributing them across the processors according to an operative load balancing or distribution scheme. In one embodiment, the flow distributor can comprise one or more operations, functions or logic to determine how to distribute packers, work or load accordingly. In still other embodiments, the flow distributor can comprise one or more sub operations, functions or logic that can identify a source address and a destination address associated with a data packet, and distribute packets accordingly.

In some embodiments, the flow distributor can comprise a receive-side scaling (RSS) network driver, module or any type and form of executable instructions which distribute data packets among the one or more cores 505. The RSS module can comprise any combination of hardware and software. In some embodiments, the RSS module works in conjunction with the flow distributor to distribute data packets across the cores 505A-N or among multiple processors in a multi-processor network. The RSS module can execute within the NIC in some embodiments, and in other embodiments can execute on any one of the cores 505.

In some embodiments, the RSS module uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may be used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hash result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system does not include a RSS driver or RSS module. In some of these embodiments, a software steering module (not shown) or a software embodiment of the RSS module within the system can operate in conjunction with or as part of the flow distributor to steer packets to cores 505 within the multi-core system.

The flow distributor, in some embodiments, executes within any module or program on the appliance 200, on any one of the cores 505 and on any one of the devices or components included within the multi-core system. In some embodiments, the flow distributor can execute on the first core 505A, while in other embodiments the flow distributor can execute on the NIC. In still other embodiments, an instance of the flow distributor can execute on each core 505 included in the multi-core system. In this embodiment, each instance of the flow distributor can communicate with other instances of the flow distributor to forward packets back and forth across the cores 505. There exist situations where a response to a request packet may not be processed by the same core, i.e. the first core processes the request while the second core processes the response. In these situations, the instances of the flow distributor can intercept the packet and forward it to the desired or correct core 505, i.e. a flow distributor instance can forward the response to the first core. Multiple instances of the flow distributor can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

While the flow distributor can execute within the multi-core system, in some embodiments the flow distributor can execute on a computing device or appliance remotely located from the multi-core system. In such an embodiment, the flow distributor can communicate with the multi-core system to take in data packets and distribute the packets across the one or more cores 505. The flow distributor can, in one embodiment, receive data packets destined for the appliance 200, apply a distribution scheme to the received data packets and distribute the data packets to the one or more cores 505 of the multi-core system. In one embodiment, the flow distributor can be included in a router or other appliance such that the router can target particular cores 505 by altering meta data associated with each packet so that each packet is targeted towards a sub-node of the multi-core system. In such an embodiment, CISCO's vn-tag mechanism can be used to alter or tag each packet with the appropriate meta data.

Illustrated in FIG. 5 is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5, and in more detail, the cores 505A-N as well as the control core 505A can be any processor described herein. Furthermore, the cores 505A-N and the control core 505A can be any processor able to function within the system 575 described in FIG. 5. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5 illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plane 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

E. Systems and Methods for Providing a Distributed Cluster Architecture

As discussed in the previous section, to overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Figure 6:
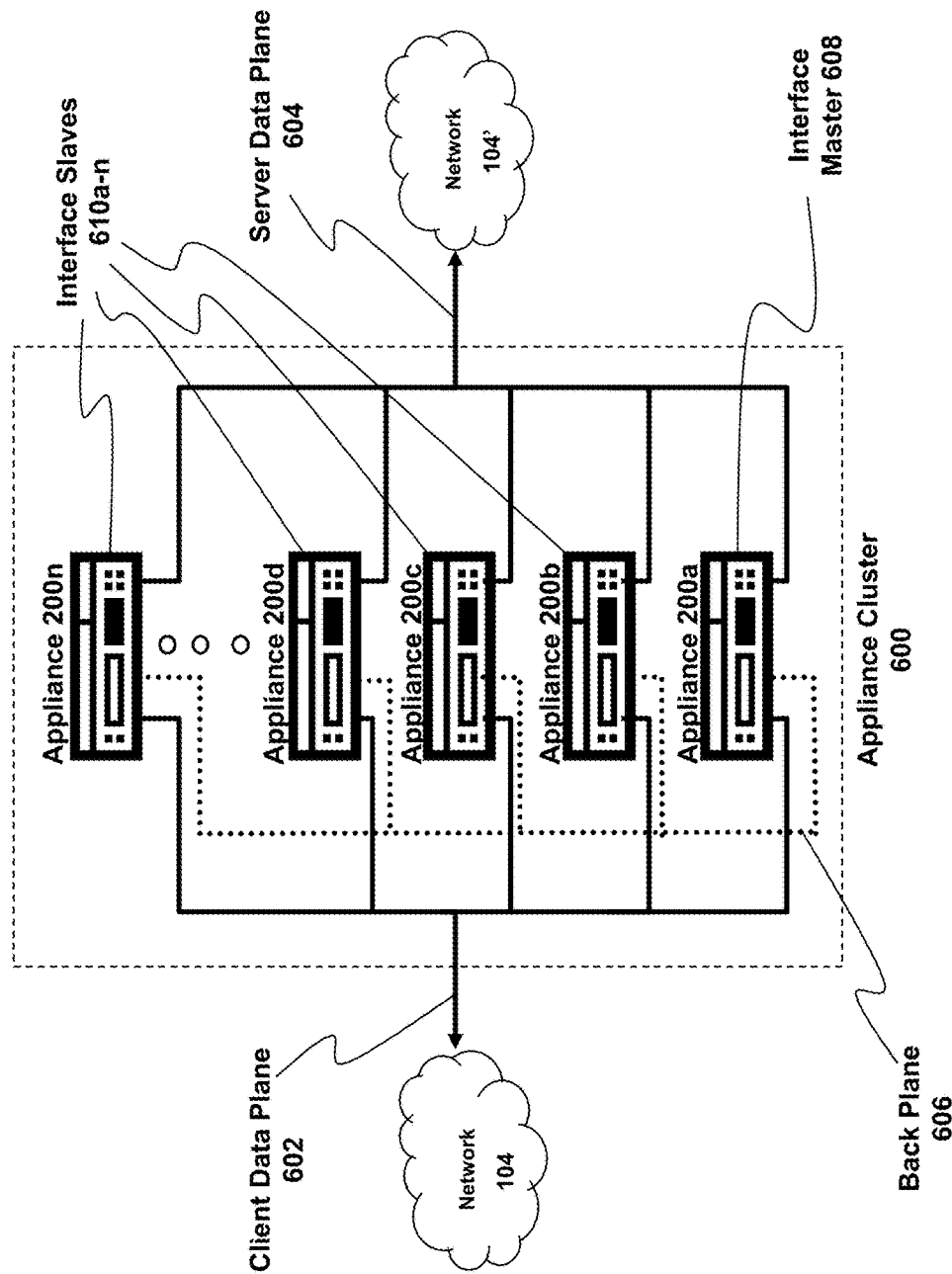
FIG. 6 is a block diagram of an embodiment of a cluster system.

Referring now to FIG. 6, illustrated is an embodiment of a computing device cluster or appliance cluster 600. A plurality of appliances 200a-200n or other computing devices, sometimes referred to as nodes, such as desktop computers, servers, rack mount servers, blade servers, or any other type and form of computing device may be joined into a single appliance cluster 600. Although referred to as an appliance cluster, in many embodiments, the cluster may operate as an application server, network storage server, backup service, or any other type of computing device without limitation. In many embodiments, the appliance cluster 600 may be used to perform many of the functions of appliances 200, WAN optimization devices, network acceleration devices, or other devices discussed above.

In some embodiments, the appliance cluster 600 may comprise a homogenous set of computing devices, such as identical appliances, blade servers within one or more chassis, desktop or rack mount computing devices, or other devices. In other embodiments, the appliance cluster 600 may comprise a heterogeneous or mixed set of devices, including different models of appliances, mixed appliances and servers, or any other set of computing devices. This may allow for an appliance cluster 600 to be expanded or upgraded over time with new models or devices, for example.

In some embodiments, each computing device or appliance 200 of an appliance cluster 600 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing to multiple cores. Accordingly, in such embodiments, the node distribution system need not manage flow distribution to individual cores, as that may be taken care of by a master or control core as discussed above.

In many embodiments, an appliance cluster 600 may be physically grouped, such as a plurality of blade servers in a chassis or plurality of rack mount devices in a single rack, but in other embodiments, the appliance cluster 600 may be distributed in a plurality of chassis, plurality of racks, plurality of rooms in a data center, plurality of data centers, or any other physical arrangement. Accordingly, the appliance cluster 600 may be considered a virtual appliance, grouped via common configuration, management, and purpose, rather than a physical group.

In some embodiments, an appliance cluster 600 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 600 may be similarly deployed to operate as a single appliance. In many embodiments, this may not require any network topology changes external to appliance cluster 600, allowing for ease of installation and scalability from a single appliance scenario. In other embodiments, an appliance cluster 600 may be similarly deployed as shown in FIGS. 1B-1D or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 600. In yet still other embodiments, an appliance cluster 600 may comprise a mix of appliances 200 or virtual machines configured as appliances 200. In some embodiments, appliance cluster 600 may be geographically distributed, with the plurality of appliances 200 not co-located. For example, referring back to FIG. 6, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 600, communications from clients and servers at the corporate headquarters may be directed to the appliance 200b deployed at the site, load balancing may be weighted by location, or similar steps can be taken to mitigate any latency.

Still referring to FIG. 6, an appliance cluster 600 may be connected to a network via a client data plane 602. In some embodiments, client data plane 602 may comprise a communication network, such as a network 104, carrying data between clients and appliance cluster 600. In some embodiments, client data plane 602 may comprise a switch, hub, router, or other network devices bridging an external network 104 and the plurality of appliances 200a-200n of the appliance cluster 600. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 600. Thus, in many embodiments, the interface master may comprise a flow distributor external to appliance cluster 600. In other embodiments, the interface master may comprise one of appliances 200a-200n. For example, a first appliance 200a may serve as the interface master, receiving incoming traffic for the appliance cluster 600 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves 610A-610N.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 600 may be connected to a network via a server data plane 604. Similar to client data plane 602, server data plane 604 may comprise a communication network, such as a network 104', carrying data between servers and appliance cluster 600. In some embodiments, server data plane 604 may comprise a switch, hub, router, or other network devices bridging an external network 104' and the plurality of appliances 200a-200n of the appliance cluster 600. For example, in one such embodiment, a router may be connected to an external network 104', and connected to a network interface of each appliance 200a-200n. In many embodiments, each appliance 200a-200n may comprise multiple network interfaces, with a first network interface connected to client data plane 602 and a second network interface connected to server data plane 604. This may provide additional security and prevent direct interface of client and server networks by having appliance cluster 600 server as an intermediary device. In other embodiments, client data plane 602 and server data plane 604 may be merged or combined. For example, appliance cluster 600 may be deployed as a non-intermediary node on a network with clients 102 and servers 106. As discussed above, in many embodiments, an interface master may be deployed on the server data plane 604, for routing and distributing communications from the servers and network 104' to each appliance of the appliance cluster. In many embodiments, an interface master for client data plane 602 and an interface master for server data plane 604 may be similarly configured, performing ECMP or LAG protocols as discussed above.

In some embodiments, each appliance 200a-200n in appliance cluster 600 may be connected via an internal communication network or back plane 606. Back plane 606 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 606, and from second appliance to server, and vice versa. In other embodiments, back plane 606 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 606. For example, a first node or master node may select an RSS key, such as at startup or boot, and may distribute this key for use by other nodes. In some embodiments, back plane 606 may comprise a network between network interfaces of each appliance 200, and may comprise a router, switch, or other network device (not illustrated). Thus, in some embodiments and as discussed above, a router for client data plane 602 may be deployed between appliance cluster 600 and network 104, a router for server data plane 604 may be deployed between appliance cluster 600 and network 104', and a router for back plane 606 may be deployed as part of appliance cluster 600. Each router may connect to a different network interface of each appliance 200. In other embodiments, one or more planes 602-606 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 600. In some embodiments, the control plane may be a fourth physical network, while in other embodiments, the control plane may comprise a VPN, tunnel, or communication via one of planes 602-606. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 606; or any other type and form of interface.

In some embodiments, as discussed above, appliance cluster 600 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 600. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 600 may receive communications from external routers via connection mirroring.

In many embodiments, flow distribution among nodes of appliance cluster 600 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g. TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as its internal IP address. In other embodiments, the flow distributor may assign internal IP addresses to each node within the appliance cluster 600. Traffic arriving from external clients or servers, such as a workstation used by an administrator, directed to the internal IP address of the appliance (1.2.3.4) may be forwarded directly, without requiring hashing.

G. Systems and Methods for Load Balancing Service Chains

The present disclosure is directed towards systems and methods for load balancing service chains. In particular, the present solution relates to systems and methods for load balancing service chains using metadata related to instances of the services of the service chains. For example, systems and methods of the present solution can identify service chains that each include a path having an instance of a first service and an instance of a second service, determine a path weight for each of the service chains, and select a service chain from the service chains based on a load balancing function and the path weight.

A service chain can refer to instances of services that are linked or grouped together. For example, a client computing device can transmit a packet through a network towards a server. The packet may be processed in various ways prior to the packet reaching the destination server. For example, a provider of the network may have a set of policies about specific operations that are to take place on the packet (or flow) before it can be forwarded to the destination server. An appliance in the path of the packet can implement these policies, which may include, e.g., a firewall or intrusion detection system.

A firewall may provide a set of services, such as network address translation, deep packet inspection, and access control. The firewall can be split or separated into these different services and executed by the computing infrastructure. For example, a first instance or virtual machine executed by the computing infrastructure can perform a first service of network address translation, a second instance or virtual machine executed by the computing infrastructure can perform a second service of deep packet inspection, and a third instance or virtual machine executed by the computing infrastructure can perform a third service of access control. These three services can be grouped or linked together as a service chain to provide the firewall.

For example, the service chain can include, correspond to, or be associated with a list of network addresses, a list of identifiers, or a list of labels that identify the instances of services of the service chain. For example, the service chain can be configured with a multiprotocol label switching (MPLS) technique. MPLS can be a data-carrying technique configured to direct data from one network node to the next network node based on path labels. The MPLS label or other identifier identify can identify virtual links or paths between nodes. The label technique can encapsulate packets of various network protocols.

Using the list of identifiers or labels, the controller can direct the packet along the service chain. For example, the first label can cause the network to forward the traffic to the first service in the service chain, which then pops its label and forwards the packet along. The second label can cause the packet to be sent to the second service, which then pops the second label and forwards the packet along.

However, since instances of services may be distributed across multiple regions, availability zones, and more, forwarding packets to multiple service nodes to provide the set of services (e.g., firewall) can increase the stretch through the network and introduce additional overhead as the data packets travels through one or more data center zones or partitions. For example, rather than passing through the network core once, packets may cross the fabric once per service. This can also introduce additional latency and delay through the network.

In such multihop processing deployments (e.g. service chaining), each hop may be a load balancing system. However, load balancing at every hop level (service node level) may not lead to globally optimal multihop processing. Load balancing at every hop level may be independent of other hop level processing, so it may not provide optimal end-to-end traffic processing. For example, in a service chain cloud deployment or computing infrastructure, client-server traffic may cross various cloud partition boundaries multiple times for end-to-end processing. This can result in increased latency and network overhead that adversely affects throughput.

The systems and methods of the present disclosure provide service chain load balancing by determining a global view of the multihop deployment, analyzing the possible paths, identifying optimal paths, and load balancing traffic across the identified optimal paths. For example, a controller can use APIs to obtain, retrieve, receive or fetch metadata about every instance. The controller can receive the metadata from an informational store or database of the computing infrastructure that maintains user account information and their resource allocations. The controller can determine the placement of the instances in the computing infrastructure, resource allocation (CPU, memory, bandwidth), type of reservation, type of connectivity, etc. Using the retrieved information, the controller can derive a cost associated with every instance. In some cases, if the computing infrastructure does not have an informational store or the controller is not configured to or otherwise cannot access the information store, the controller can receive inputs from an administrator to calculate the cost associated with instances.

For example, and in some embodiments, the computing infrastructure can be configured with a service chain that groups the following services together: firewall (FW) to intrusion detection system (IDS) to a web service (WS). The computing infrastructure can include multiple instances of each service as follows: three instances of the firewall service; two instances of the IDS service; and 3 instances of the web service. The controller can determine the total number of paths for the service chain based on the number of instances of each service chain as follows: 3 FW×2 IDS×3 WS=18 paths.

The controller can determine the edge weight using the metadata received from the information repository. The controller can use the edge weights to determine the path weights. The path weight can be determined using one or more path weight calculation techniques or algorithms. The controller can sort the path weights in ascending or descending order, depending on the weight assignment algorithm. For example, the controller can rank the path weights from most efficient to least efficient such that the highest ranking path weight corresponds to the most efficient service chain. In some cases, the controller can rank the path weights from least efficient to most efficient such that the lowest ranking path weight corresponds to the most efficient service chain.

The controller can select one or more optimal service chains or paths based on the sorted or ranked table. The controller can select a predetermined number of highest ranking paths, where highest ranking can correspond to the most efficient or optimal paths. For example, the controller can select the top three entries of the sorted table as follows: P1: FW1→IDS1→WS1 (Optimal Path 1); P7: FW2→IDS1→WS1 (Optimal Path 2); P3: FW1→IDS1→WS3 (Optimal Path 3). The controller can use the paths indicated by the top three entries to process traffic more efficiently (e.g., low latency, less overhead, high throughput, low cost, etc.).

In some embodiments, the controller can analyze all 18 possible paths to select the highest ranking paths. In some embodiments, the controller can use a machine learning technique or pruning technique to select optimal paths without analyzing every possible path. For example, the controller can determine that paths where at least two instances are not in the same data center zone or partition are less efficient, and filter those paths out prior to sorting them.

In some embodiments, the controller can determine whether there are any instances provided by the computing infrastructure that are missing from the selected optimal paths and includes additional paths to cover all the instances. The controller can identify the missing instances and select an additional path such that all instances provided by the computing infrastructure are utilized by the controller to load balance service chain. For example, none of the three selected optimal paths 1, 2 or 3 include the instances FW3, IDS2 and WS2. The controller can then parse the sorted table to identify an additional optimal path that includes one or more of these instances. For example, the controller can select the highest ranking path that includes one or more of the missing instances as: P17: FW3→IDS2→WS2 (Optimal Path 4). In some cases, the controller can repeatedly parse the table to identify the highest ranking path that includes a missing instance until all the instances provided by the computing infrastructure are represented in the selected optimal paths.

The controller can load balance the optimal paths using a load balancing technique or algorithm. The controller can use the determined path weights of the selected optimal paths with a load balancing algorithms as a weighted load balancing solution to improve performance.

While the techniques disclosed herein can be used in an ADC environment, the systems and methods of the present disclosure can improve the operation of networking devices such as firewalls, routers, optimization systems, rate-limiting systems, access control systems, etc.

Figure 7A:
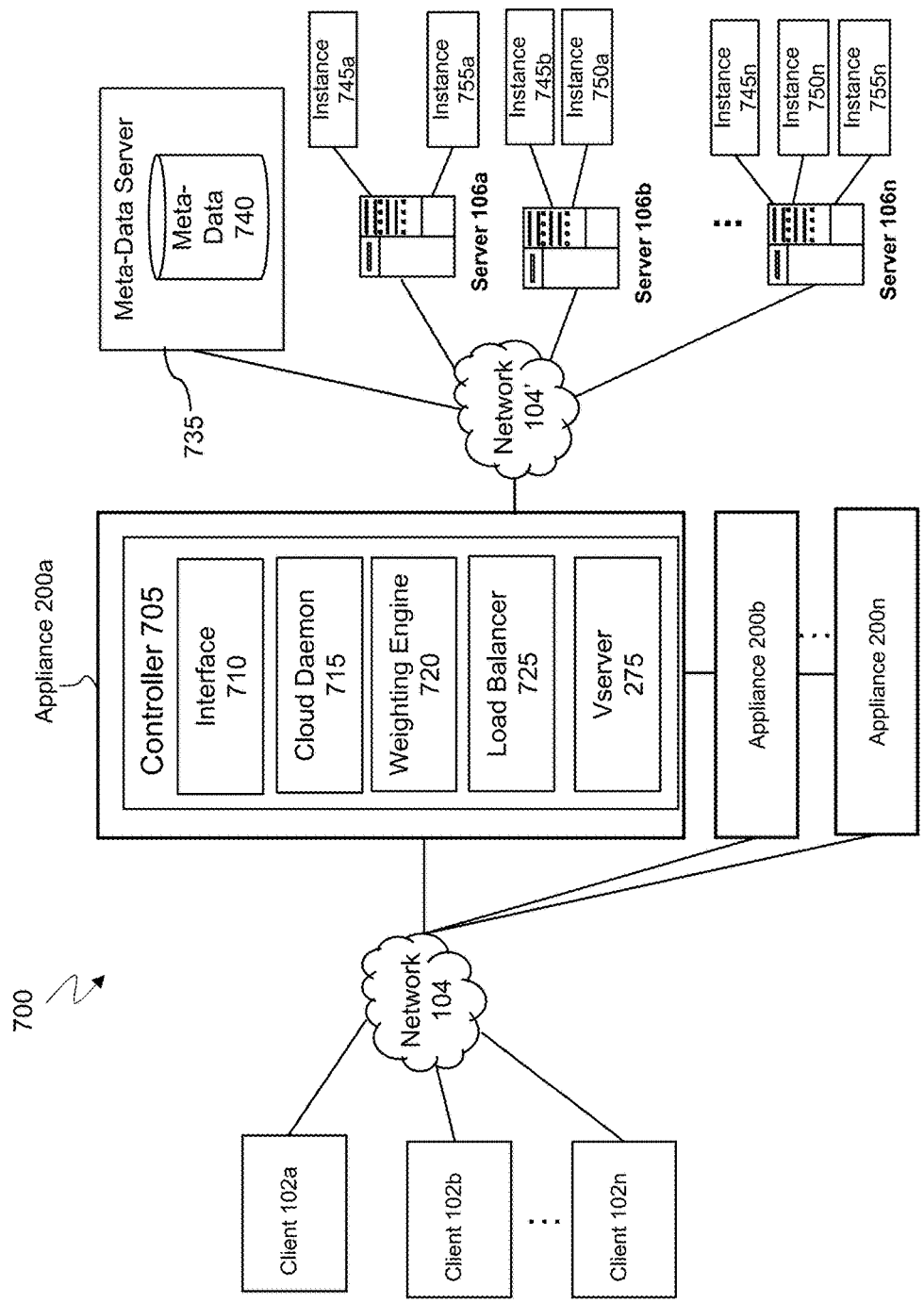
FIG. 7A is a block diagram of an embodiment of a system for load balancing service chains.

Now referring now to FIG. 7A, a block diagram of an embodiment of a system for load balancing service chains is shown. The system 700 can include one or more appliances 200a-n. The appliances 200a-n can be configured with one or more features or functionality. The appliances 200a-n can each be configured with similar functionality, or different functionality. In some embodiments, appliance 200a includes a controller 705. The controller 705 can include an interface 710 configured to interface or communicate with clients 102a-n, server 106a-n, and meta-data server 735. The controller 705 can include a cloud daemon 715 that retrieves, from metadata server 735, metadata or account information related to service chains or instances of services in the computing infrastructure. The controller 705 can include a weighting engine 720 that uses the metadata to generate edge weights for each instance of each service and path weights for each service chain. The controller 705 can include a load balancer 725 that is configured to use the weights generated by the weighting engine 720 to select a service chain to direct network traffic from a client 102. The controller 705 can include vserver 275. The controller 705 can execute a vserver 275. The controller 705 can execute on a vserver 275 that executes on one or more processors of appliance 200a. The system 700 can refer to or include the computing infrastructure. The computing infrastructure can include or refer to the one or more servers 106a-n.

The system 700 can include or access a meta-data server 735. The meta-data server can be maintained or managed by an administrator or other entity associated with the computing infrastructure, such as a provider of an IaaS service. An IaaS service can include, for example, self-service models for accessing, monitoring, and managing remote datacenter infrastructures, such as compute (virtualized or bare metal), storage, networking, and networking services (e.g. firewalls). A user or customer of an IaaS cloud service can purchase IaaS based on consumption, similar to electricity or other utility billing, rather than purchase hardware outright. In some cases, customers of the IaaS may manage applications, data, runtime, middleware, and operating systems. However, the IaaS provider may manage virtualization, servers, hard drives, storage, and networking. The IaaS provider can offer databases, messaging queues, and other services above the virtualization layer.

The meta-data server 735 can include or access a meta-data information store 740 or meta-data database 740 that includes one or more meta-data data structures storing meta-data. Meta-data can include information about or associated with accounts of the cloud environment. Meta-data can include account information related to the cloud environment. For example, a provider of cloud infrastructure (or an IaaS provider) can maintain an informational store or meta-data database 740 about their customer accounts. The meta-data database 740 can include customer or user account information. The account information can include the customer's resource allocations that indicate the quantity or type of resources consumed by the customer. The IaaS provider can use the user's resource allocation information stored in meta-data database 740 for billing, maintenance, analysis, etc.

The computing infrastructure can include computation resources such as servers, processors, or memory that are located in different zones, partitions, racks, or geographic areas. For example, a partition can depict a division of an IaaS and define an area of an IaaS cloud used by customer of the IaaS. A partition can be made at one or more levels, such as provider level, region level, zone level or rack level. Partition groups can be defined in the partition definition and stored in the meta-data database 740. A partition group (or network partition) can include an area of an IaaS that may be bound by one network of an IaaS (e.g., region). Each region can demarcate a separate geographical area. Each region can have multiple, isolated locations that are referred to as zones. Thereby, several partitions can be included inside a network partition. In some cases, multiple partition groups can have multiple partitions for the purpose of high availability. For example, multiple partitions can be defined to instruct an appliance 200a or service to spawn instances in multiple areas (e.g., region, zone or rack). Instances spawned in multiple availability zones can allow the system to remain functional even if one availability zone is down or load balance among different zones.

The appliance 200 can include one or more functionality or component of appliance cluster 600 depicted in FIG. 6. The appliance 200 can manage or optimize the delivery of services, website content, resources or applications provided via the servers 106a-n over the network 104 or network 104', by providing application-level security, optimization, or traffic management. The appliance 200 may be the same or similar to the appliance cluster 600 described above with respect to FIGS. 1-6, or include one or more functionality or components thereof. In some embodiments, the clients 102a-n are the same or similar to the clients 102a-n and the servers 106a-n are the same or similar to the servers 106a-n as described above with respect to FIGS. 1-6, or include one or more functionality or components thereof. In some embodiments, the clients 102 and servers 106 of system 700 are further configured to perform functions or provide features for authenticating a client. The controller 705, interface 710, cloud daemon 715, weighting engine 720, or load balancer 725 can include digital circuitry, hardware, one or more processors, memory or software designed, constructed and configured to facilitate managing cloud-based services.

Still referring to FIG. 7A, and in further detail, appliance 200a includes an interface 710. The interface 710 can include an application programming interface, a graphical user interface, communication ports, or be configured with one or more communication or networking protocols, such as TCP/IP, etc. The interface 710 can be configured to receive or intercept data packets, receive data packets, monitor network traffic, or otherwise obtain or transmit/convey information via network 104 or network 104'.

In some embodiments, the interface 710 receives a request from a client 102a of the plurality of clients 102a-n. The interface 710 may receive the request via a networking protocol, communication protocol, application layer protocol, transport protocol, or encryption protocol. Protocols can include, e.g., HTTP, TCP, ICA, or HDX. The protocol can be a stateful protocol or a stateless protocol. The request may include information about the client or the resource to which the client 102a is requesting access. In some embodiments, the resource provided by server 106a-n may be a secure resource for which a client or user of the client device may require authentication, authorization or approval before access is granted.

In some embodiments, the interface 710 is designed and constructed to receive network communications from one or more clients 102a-n and forward or direct network communications to one or more servers 106a-n. The interface 710 can be the same or similar to the interfaces 608 or 610a-n described above with respect to FIGS. 1-6, or include one or more functionality or components thereof. The interface 710 can receive data packets from a client 102a. The interface 710 can forward or relay the data packets received from client 102a to a destination server. For example, the interface 710 can be configured to automatically forward data packets received from a client agent 120a to a server 106a or instance 745. The interface 710 can be further configured to attract network traffic from clients 102a-n based on a state or mode of the appliance 200a. For example, appliance 200a may be the primary device 200a. The primary device 200a can refer to the intermediary device of an active-standby intermediary appliance pair that is currently in the active mode. Thus, the interface 710 of appliance 200a can receive network traffic from clients 102a-n if appliance 200a is currently the primary device configured to actively service requests from clients, and forward the requests to one or more servers 106a-n.

In some embodiments, the controller 705 includes a cloud daemon 715 designed and constructed to receive account information related to each of a plurality of instances (e.g., instances 745a-n, instances 750a-n, or instances 755a-n) of one or more services provided by one or more servers of a cloud environment or computing infrastructure. The cloud daemon 715 can be configured to execute on one or more processors. The cloud daemon 715 can be configured to execute or run as a background process. In some cases, the cloud daemon 715 can be configured based on a time interval, periodically, or responsive to a condition or trigger event. For example, the cloud daemon 715 can execute or run every 1 minute, 5 minutes, 10 minutes, 30 minutes, hourly, every 12 hours, daily, overnight, etc. In some cases, the cloud daemon 715 can be configured to execute or run responsive to an indication from a user or administrator of the cloud environment. In some embodiments, the cloud daemon 715 can be configured to run based on a condition, such as a determination that a new instance of a service has launched, a failover of an instance, a termination of an instance, a new request from a client 102a, or an addition, update or modification of a customer account.

The controller 705 (e.g., via interface 710 or cloud daemon 710) can determine or identify services, instances, and service chains. An instance can refer to an instance of a service that facilitates providing the service to the one or more clients 102a-n. The controller 705 can direct packets to a service chain that provides the one or more services. The instances can include one or more available instances. The instances can include an active instance or a passive instance. The instances can include virtual machines or vservers 275 that are executing on the appliance 200a or a server 106a-n.

The controller 705 can include one or more vservers 275 that are executing to direct network traffic from multiple clients 102a-n to multiple servers 106a-n. The cloud daemon 715 can ping, poll, request, or otherwise identify the instances. For example, the cloud daemon 715 can generate a ping or request for a response from all active service chains, services, or instances thereof. Responsive to the ping or request, the cloud daemon 715 can receive responses from each instance. The response can include an identifier of the service chain or instance. The response can include an account identifier of a customer associated with the service chain or instance. For example, the response can identify an IaaS service chain provided by the computing infrastructure.

The controller 705 can identify multiple service chains that include a path. The path can have a first instance (e.g., 745a) of a first service provided by the computing infrastructure (e.g., servers 106a-n), and an instance (e.g., 745b) of a second service provided by the computing infrastructure (e.g., servers 106a-n). The controller 705 (e.g., via cloud daemon 715) can receive, retrieve or fetch meta-data or account information associated with the instance. The meta-data can include meta-data about the service to which the instance provides access. The controller 705 can retrieve the meta-data from a meta-data server 735.

In some embodiments, the controller 705 can use a cloud application programming interface (API) to generate one or more queries to identify each instance of the plurality of service chains. The controller 705 can receive, responsive to the one or more queries, an indication of one or more service chains including one or more paths each having one or more instances of services. The controller 705 can generate one or more queries using the cloud API to retrieve metadata for each instance of the plurality of service chains. The information can include or refer to meta-data associated with the service provided via the instance. The query can include a request for information regarding the service's resource allocation, cloud placement, resource consumption, type of reservation, or type of connectivity. Cloud placement of the service can indicate partition information, such as a zone, data center, geographic area, network partition, or drive partition on which the service executes. A type of reservation can be used to provision a machine that has sufficient capacity for a service. A type of reservation can include a policy used to provision machines with sufficient capacity for a service, such as sufficient storage, computing power, processor speed, memory, applications, graphical processing unit, bandwidth, etc. The reservation can include a virtual reservation. A virtual reservation can include a share of the memory, CPU, networking, and storage resources available to a server 106a-n to provide or execute an IaaS service. A type of connectivity can refer to a type of network 104' the server 106a uses to communicate with the appliances 200a-n or clients 102a-n. The type of connectivity can indicate an amount of bandwidth available for a service.

The controller 705 can generate one or more queries using the cloud API. In some cases, the controller 705 can be configured with one or more cloud APIs. The controller 705 can select a cloud API from a plurality of cloud APIs stored in database of the controller 705. The controller 705 can select the cloud API based on an identifier associated with the instances or services provided via the instances. For example, the controller 705 can determine, based on the identifier of the instance or the service, an account identifier. The controller 705 can use the account identifier to perform a lookup in a database stored in memory of the controller 705 to select a cloud API mapped to the account identifier. For example, a cloud monitoring API can include AMAZON CLOUDWATCH™ provided by AMAZON WEB SERVICES, Inc. of Seattle, Wash.

Using the cloud API, the controller 705 can generate one or more queries to retrieve meta-data about the service. The query can include a query for placement information for a service. Placement information for an instance can refer to a partition in a cloud environment. Placement information for an instance can refer to a partition in a cloud environment the instance accesses to provide a service. For example, the IaaS cloud service may execute at the corresponding placement. Thus, the placement information for the instance can refer to the placement of the service to which the instance provides access.

The controller 705 can transmit the generated query to the meta-data server 735 via network 104'. The controller 705 can receive, from the meta-data server 735, a response to the query that includes meta-data for the instance. Meta-data for the instance can include meta-data about the service to which the instance provides access. Meta-data for the instance can include meta-data for the service associated with the instance.

In some cases, the controller 705 can generate and transmit a separate query to the meta-data server 735 for each service chain, each instance or each associated service. In some cases, the controller 705 can generate and transmit a query that identifies multiple services provided by multiple instances. In some cases, the controller 705 can generate and transmit a query that identifies multiple instances grouped or linked together into a service chain. The controller 705 can receive a response that includes metadata for one or more services, service chains, or instances. For example, the controller 705 can receive a response for each query, or a response that includes responses to multiple queries.

The controller 705 can include a weighting engine 720 designed and constructed to determine a path weight for each service chain using the meta-data received from the meta-data server 735. The path weight can indicate a level of efficiency of delivering services in accordance with the service chain. The path weight can indicate performance computing infrastructure or user experience based on computing infrastructure performance characteristics, such as the latency, resource overhead, throughput, or resource cost, which may be based on individual weights of each instance in the path of the service chain. The path weight can indicate a logical measurement of cloud environmental impact to the hosted system, such as the IaaS services. The weight can indicate a performance of the instance of the service provided via the cloud environment.

The controller 705 can be configured with one or more techniques, functions or algorithms to determine the path weight for a service chain using the received meta-data. The controller 705 can determine an edge weight for each instance of the service chain and combine the edge weights of each instance of the service chain to determine a path weight for the service chain. For example, the computing infrastructure may provide three services. The first service can be provided by instance 745a executing on server 106a and instance 745b executing on server 106b. The second service can be provided by instance 750a executing on server 106b. The third service can be provided by instance 755a executing on server 106a. The servers 106a and 106b can be in different zones, partitions, or geographic areas.

The instances can be active instances or potential, available instances. The weighting engine 720 can use the retrieved meta-data to determine an edge weight for each of the instances 745a, 745b, 750a, and 755a. The weighting engine 720 can assign higher or lower weights to the instances based on various efficiency or performance considerations. For example, the service chain may define the data path as going from the first service to the second service and to the third service. The controller 705 may determine or identify that the network path between the controller 705 and the instance 745a may be more efficient or higher performing than the network path between controller 705 and the instance 745b. Thus, the controller 705 may assign a higher weight to instance 745a as compared to instance 745b. The controller 705 may also determine that the network path between instance 745a and instance 750a is less efficient or lower performing as compared to the network path between instance 745a and instance 750n. Thus, the controller 705 can assign a higher weight instance 750a as compared to instance 750n. The controller 705 can determine that the network path between instance 750a and instance 755a is more efficient or higher performing than the network path between 750a and 755n.

Thus, the controller 705 can determine an edge weight for each instance of the service chain. The weighting engine 720 can assign a higher or lower weights to instances based on the network path, processor speed, bandwidth, memory, configuration, location, or availability. In some cases, if the controller 705 is in the same zone as the instance, the controller can assign a higher weight because directing a packet to an instance in the same zone may result in reduced latency and increased throughput. The weighting engine 720 can assign a lower weight to the second instance because the appliance and the service are in different zones, which may result in increased latency and reduced throughput. For example, the weighting engine 720 can assign a weight of 1, 2, 3, 5, 10 or another number to the first instance. The weighting engine 720 can assign a weight of negative 1 (−1), 0, 1, 2, 3 or some other weight to the second instance. The weighting engine 720 can assign weights that indicate a level of performance provided by the cloud environment for the instance of the service.

The weighting engine 720 can assign weights based on a distance between the controller 705 and the server providing the instance. For example, the weighting engine 720 can determine a geographic location for the appliances 200a-n. The weighting engine 720 can use the received meta-data to determine a geographic location of the servers 106a-n providing the instances of the services. The weighting engine 720 can determine a distance between each appliance and each instance based on the geographic locations. For example, the weighting engine 720 can query a mapping engine or mapping tool that determine a geographic distance between the appliance 200 and the server executing the instance. In another example, the weighting engine 720 can cause an appliance to ping a server and use the ping response time to determine a distance or response time. The weighting engine 720 can assign a weight based on the distance or the response time. For example, the weighting engine 720 can rank the instances of the appliance and service based on the response, and assign a highest weight to the instance of the service corresponding to the shortest response time, a second highest weight to the instance of the service corresponding to the second shortest response time, etc.

The weighting engine 720 can assign the weight to the instances of the services based on one or more factors such as placement, a reservation type or capacity of the instance of the service, bandwidth, or type connectivity. For example, the weighting engine 720 can determine, based on the received meta-data, the weight for a first instance of the service as follows: instance_one_weight=+5 (due to same zone)+2 (due to available bandwidth of 500 Mbps)=7. The weighting engine 720 can determine, based on the received meta-data, the weight for the second instance of the service as follows: instance_two_weight=+1 (due to different zones)+4 (due to available bandwidth of 1000 Mbps)=5. The weighting engine 720 can compare the first weight with the second weight to determine the instance corresponding to the highest weight. The weighting engine 720 can perform this weight determination for each instance of each service chain.

The controller 720 can use the weights for each instance of each service chain to determine a path weight for the service chain. For example, the available paths may include:

TABLE 1

Illustrates available paths, edge weights, and path weights in accordance with an embodiment.

| # | Path | Calculation | Path Weight |
|---|---|---|---|
| 1 | 745a, 750a, 755a | W001 + W111 + W211 | PW1 |
| 2 | 745a, 750n, 755a | W111 + W131 + W211 | PW2 |
| 3 | 745a, 750a, 755n | W001 + W111 + W311 | PW3 |
| 4 | 745a, 750n, 755n | W001 + W131 + W311 | PW4 |
| 5 | 745b, 750a, 755a | W002 + W111 + W211 | PW5 |
| 6 | 745b, 750n, 755a | W002 + W131 + W211 | PW6 |
| 7 | 745b, 750a, 755n | W002 + W111 + W311 | PW7 |
| 8 | 745n, 750n, 755n | W003 + W131 + W311 | PW8 |

As illustrated in table 1, there are total of 8 possible service chains that each include a path between instances of three services provided by the computing infrastructure. The controller 705 can determine an edge weight for each instance (e.g., W001, W111, W211). The controller 705 can then combine the edge weights to determine a path weight. The controller 705 can combine the edge weights using any function, algorithm or technique. For example, the controller 705 can sum the edge weights for each instance of the service chain, multiple the edge weights, determine a ratio of one or more edge weights of the service chain, input the edge weights into a function, take an average of the edge weights, etc.

The controller 705 can rank or sort the path weights based on the level of efficiency of the service chain. For example, the service chains can be ranked or sorted in descending order such that the first service chain is the optimal service chain or highest performing service chain, and the last service chain is a sub-optimal service or lowest performing service chain as illustrated in Table 2.

TABLE 2

Illustrates sorted or ranked service chains based on path weights

| # | Path | Calculation | Path Weight |
|---|---|---|---|
| 1 | 745n, 750n, 755n | W003 + W131 + W311 | PW8 |
| 2 | 745b, 750a, 755a | W002 + W111 + W211 | PW5 |
| 3 | 745b, 750a, 755n | W002 + W111 + W311 | PW7 |
| 4 | 745a, 750n, 755n | W001 + W131 + W311 | PW4 |
| 5 | 745b, 750n, 755a | W002 + W131 + W211 | PW6 |
| 6 | 745a, 750a, 755a | W001 + W111 + W211 | PW1 |
| 7 | 745a, 750n, 755a | W111 + W131 + W211 | PW2 |
| 8 | 745a, 750a, 755n | W001 + W111 + W311 | PW3 |

The controller 705 can sort the service chains based on path weights, as illustrated in Table 2. For example, service chain #1 corresponding to path weight PW8 can be the highest ranking or highest performing service chain. This may be because instances of all three services are executed by the same server. Thus, even though the edge weight W003 of instance 745n may actually be greater than the edge weight W001 of instance 745a because instance 745n is further away from controller 705, the controller 705 can determine that the service chain performs better overall and is the globally optimal service chain because the controller 705 is not performing load balancing on a per-hop level but, rather, on a multihop or service chain basis.

The controller 705 can select a predetermined number of the top performing service chains, and then perform load balancing using only the predetermined number of service chains. For example, the predetermined number of top performing service chains can be 2, 3, 4, 5, 6, 7, 10, 15, 20 or some other number that facilitates service chain load balancing. In some cases, the predetermined number can be a fixed number or a dynamic number. For example, the predetermined number can be based on the number of available services, such as half, third, quarter, fifth, sixth, or other fraction or percentage of the number of available service chains.

In some embodiments, the controller 705 can add a service chain to the selected subset of the predetermined number of top performing service chains. The controller 705 can analyze the selected service chains predetermined number of top performing service chains and determine that one or more instances provided by the computing infrastructure are missing from the subset. For example, if the top three service chains are selected from Table 2, the controller 705 can determine that instances 745a is missing or not being utilized. The controller 705 can, responsive to determining that an instance is missing from the selected service chains, parse Table 2 to identify the highest ranking service chain that includes the missing instance. In this example, the controller 705 can identify the fourth service chain corresponding to path weight PW4, and add this service chain to the subset of service chains to be used for load balancing.

In some embodiments, the controller 705 can use a machine learning technique to prune the service chains prior to determining path weights, prior to ranking or sorting the service chains, or prior to determining the subset of optimal service chains. By performing a pre-processing, filtering, or pruning technique, the controller 705 can improve the efficiency of identifying the optimal service chains.

In some embodiment, the controller 705 can be configured with a machine learning technique to prune the service chains. For example, the machine learning technique can determine that any service chain that includes instances all in the same zone is higher performing than a service chain that includes instances in two or more zones. The machine learning technique can further determine that any service chain that includes instances in two different zones is higher performing that service chains that includes instances in three or more different zones. Thus, the controller 705 can filter out service chains that include instances in three or more different zones prior to determining a path weight for the service chain or prior to sorting or ranking the service chains based on path weight.

In some embodiments, the machine learning technique can determine, based on historical data, that any service chain that includes instance 745*a* is low performing instance that is not to be selected as an optimal service chain. Thus, the controller can filter any service chain that includes this instance out prior to determining a path weight or prior to sorting the service chains based on path weight.

The controller 705 can include a load balancer 725 designed and constructed to use a load balancing function and the determined path weights for each of the service chains to select a service chain instance to direct network traffic from the client. The load balancer 725 can distribute workloads across multiple computing resources to optimize resource use, maximize throughput, minimize response time, and avoid overload of a single resource. In some cases, the load balancing function can cause the load balancer 725 to select the service chain corresponding to the highest weight. For example, the load balancer 725 can receive a data packet or request from a client 102. The load balancer 725 can retrieve or identify the service chains corresponding to the request that are identified as optimal for the computing infrastructure. For example, the load balancer 725 can determine that the optimal service chains correspond to path weights PW8, PW5, PW7, and PW4. The loads balancer 725 can apply a load balancing function using the path weights to select a service chain to direct network traffic from the client.

In some embodiments, the load balancer 725 can use a load balancing algorithm (or load balancing technique) that defines criteria that the appliance 200*a* can use to select the service chain to which to direct traffic. When the load balancer 725 determines that the configured criteria are met for one server, the appliance can then select a different service. In some cases, the load balancer can select service chains using a least connection technique. The least connections technique can select the service chain with the least number of active connections to balance the load of the active requests among service chains and instances thereof.

The load balancer 725 can provide for further granularity of configuration by using path weights. For example, the load balancer 725 can apply the determined path weights to the least connections load balancing function. The load balancer 725 can select a service chain based on a weighted value N{w} of the following expression: N{path weight}= (Number of active transactions)*(10000/path weight).

For example, the first service chain can have 50 active transactions and be assigned a weight of 3. The second service chain can have 80 active transactions and be assigned a weight of 5. Thus, the weighted value N{path weight} for the first service chain can be 50*(10000/3)=166, 667. The weighted value N{path weight} for the second service chain can be 80*(10000/5)=160,000. The load balancer 725 can use the weighted least connection technique to select the service chain with the least N{path weight} value for each request. The following Table 2 illustrates how a cloud aware load balancer 725 can use meta-data to generate path weights to select service chains to direct network traffic for the following requests:

TABLE 3

Illustrative Example of cloud aware service chain load balancing

| Request # | N{pw} of first service chain | N{pw} of second service chain | Selected service chain |
|---|---|---|---|
| 1 | 166,667 | 160,000 | Second service chain |
| 2 | 166,667 | 162,000 | Second service chain |
| 3 | 166,667 | 164,000 | Second service chain |
| 4 | 166,667 | 166,000 | Second service chain |
| 5 | 166,667 | 168,000 | First service chain |
| 6 | 170,000 | 168,000 | Second service chain |
| 7 | 170,000 | 170,000 | Round Robin - First service chain or Second service chain |

As illustrated in Table 3 above, the second service chain has the least N{pw} value for the four requests and is selected to direct network traffic from the one or more clients. As each request is received from one or more clients, the N{pw} for the second service chain increases based on the least connection function. When the fifth request comes in, the first service chain has the least N{pw}, so the load balancer selects the first service chain. When the sixth request is received from a client, the second service chain has the least N{pw}, so the load balancer selects the second service chain. When the seventh request is received, both the first and second service chain have the same N{pw}. At this point, the load balancer can be configured to select one of the service chain based on a round robin approach or randomly select one or the other service chain, or default to the first service chain or the second service chain.

In some embodiments, the controller 705 can use the meta-data to facilitate caching data in memory or storage of an appliance. The controller 705 can use the received meta-data to determine the zone information for each instance of each service chain provided by the computing infrastructure. The controller can determine, using the received meta-data, that a first instance of a first service is provided via a first zone, and a second instance of a second service is provided via a second zone. The controller 705 can determine, using the cloud information or the weights, that the controller 705 is located in, near, or has a shorter response time with the first zone as compared to the second zone. Thus, the controller 705 can determine to store or cache data related to the second instance in memory or storage of the controller 705 or appliance 200*a* in order to improve cloud performance. Data may include, for example, data files or applications that are frequently requested from, or provided by the second service.

Figure 7B:
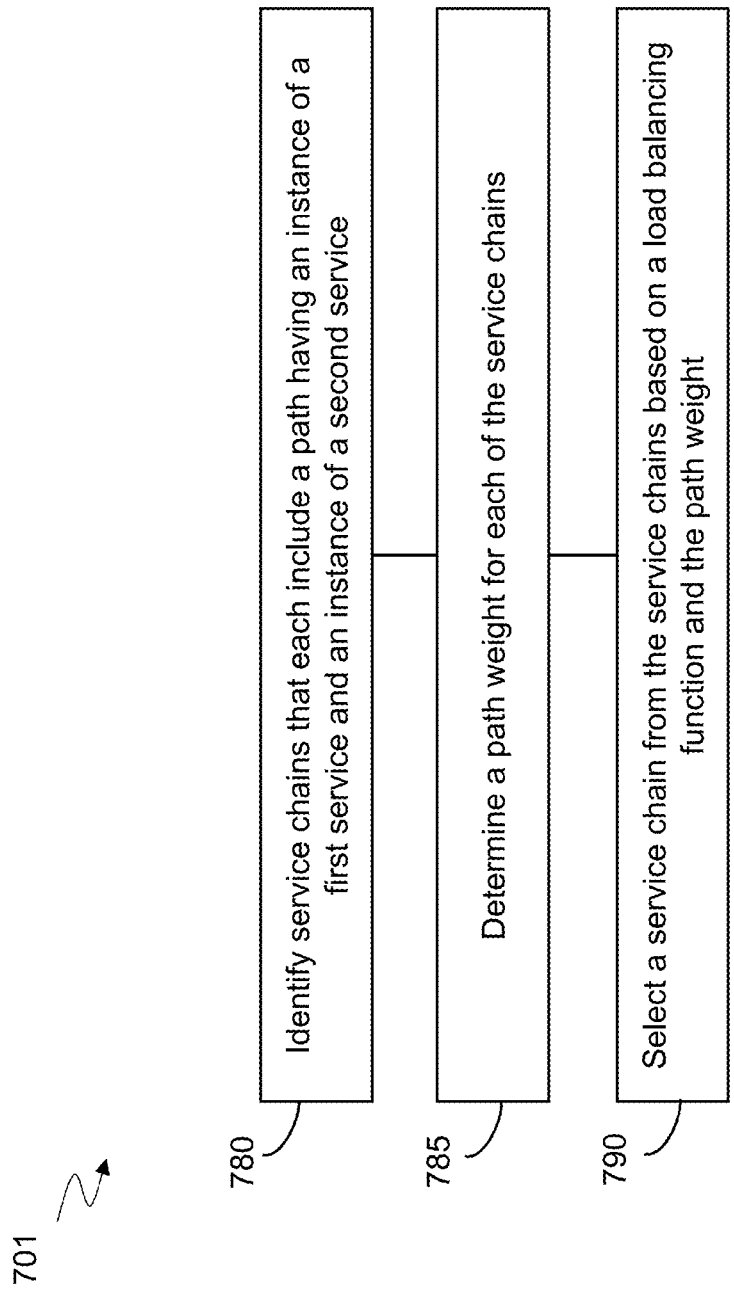
FIG. 7B is a block diagram of an embodiment of a method of load balancing service chains.

Referring now to FIG. 7B, a block diagram of an embodiment of a method of load balancing service chains is shown. The method 700 can be performed using one or more system or component described in FIG. 1-7A, 8, or 9A-9C. In brief overview, and in some embodiments, a controller identifies service chains that each include a path having an instance of a first service and an instance of a second service at step 780. At step 785, the controller determines a path weight for each of the service. At step 790, the controller selects a service chain from the service chains based on a load balancing function and the path weight, and directs network traffic from a client via the selected service chain.

Still referring to FIG. 7B, and in further detail, a controller identifies service chains that each include a path having an instance of a first service and an instance of a second service at step 780. The controller can be intermediary to one or more clients and one or more servers that provide one or more services. The one or more servers can be in one or more networked environments (e.g., one or more zones, partitions, or sub-partitions). The servers can be part of a cloud environment, such as an IaaS cloud. The cloud environment can include the controller, or the controller can provide clients access to the servers of the cloud environment. The controller can determine or identify each instance associated with the cloud environment. The controller can ping, poll, request, monitor, track or otherwise determine the instances associated with the cloud environment. For example, the controller can determine that the cloud provides a service that includes a set of services chained together in a service chain. The service chain can include services such as a firewall, intrusion detection system and web service. The service chain can have a path or define a path that directs traffic or data from a client to the firewall, intrusion detection system, and web service. The controller can determine or identify that the cloud environment provides one or more instances of each of the services in the service chain. For example, the controller can generate one or more queries to a metadata server storing account information corresponding to the service or service chain associated with the traffic from the client. For example, the controller may periodically query the metadata server to identify all the instances provided by the computing infrastructure. In some cases, the controller may perform service chain load balancing on some or all of the service chains or instances provided by the computing infrastructure. For example, some accounts may be configured for service chain load balancing, while other accounts for other services or service chains may not be configured for, or enable service chain load balancing.

Upon identifying the instances configured for or available to direct client traffic to one or more services in the cloud environment, the controller can retrieve account information or metadata associated with the each of the plurality of instances. The controller can use a cloud application programming interface to generate one or more queries to retrieve the account information for each of the plurality of instances. The one or more queries can be configured to retrieve information for at least one of a placement (e.g., in a cloud partition, or location), resource allocation, type of reservation, or type of connectivity. The controller can generate queries for each instance that is configured to retrieve information about a corresponding service. The controller can transmit the queries to a meta-data server that stores meta-data for the instances, services, or service chains.

In some embodiments, the controller can generate a query that includes a request for information on multiple services, multiple service chains, or multiple instances thereof. In some embodiments, the query is constructed for a service, and the response to the query identifies the active or available instances of the service. In some embodiments, a first query is constructed for a service chain, and the response to the query is a list of services provided by service chain. A second query may be constructed for each service in the received list of services. The controller can then transmit the one or more second queries and receive information identifying the available, active, or launched instances for each of the services.

In some embodiments, the controller can generate a query for multiple instances. The controller can obtain different types of information about the instance and service. For example, the controller can use the cloud application programming interface to generate a query to retrieve placement information for a first instance of the plurality of instances. The placement information can include, for example, a placement of an instance of a service to which the controller directs network traffic. The placement information can include, for example, placement information corresponding to each instance to which the controller directs network traffic. The controller can transmit the query to a metadata server maintained by a provider of the cloud computing infrastructure. The metadata server can include a database storing placement information for the instances. The controller can receive the placement information for the first instance from the metadata server responsive to the query.

In some embodiments, the controller can periodically receive or fetch updated account information. The controller can request account information response to receiving a request from a client, based on a time interval, or responsive to a condition or event (e.g., addition of a new server, or a server going offline; a failover; new or updated load balancing algorithm or weight policies, etc.).

At step 785, the controller can determine a path weight for each of the service chains based on the account information. The controller can determine a path weight for each of the plurality of service chains. The path weight can indicate a level of efficiency of delivering services in accordance with the service chain. The path weight can include a numeric value, score, grade, string, text, or other indication of a level of efficiency or performance of delivering services in accordance with the path identified by the service chain. The path weight can indicate a performance of the path of the service chain provided via the cloud environment. The path weight can be based on latency, resource overhead, throughput, or resource cost. The path weight can indicate the latency, resource overhead, throughput, or resource cost, which may be based on individual weights of each instance in the path of the service chain.

To determine the path weight, the controller can determine edge weights for each instance of each of the service chains using the metadata or the account information received from the metadata server. For example, the controller can determine a higher weight for an instance based on the partition in which the instance is located, resource allocation, connection type, or other metadata. For example, the controller can determine a lower weight for an instance if the instance is in a cloud partition or zone different than the controller. The controller can assign positive or negative weights, or numerical weights ranging from a negative number to a positive number (e.g., −100 to +100). The controller can assign weights as integers, binary values, fractions, or decimals. The controller can use an exponential weighting technique or a linear weighting technique. For example, as the distance between the controller and the service increases, the weight assigned to the instance can increase exponentially or linearly.

For example, the controller can identify a service chain that includes a first path having a first instance of a first service and a first instance of a second service. The controller can identify a second service chain including a second path having a second instance of the first service and a second instance of the second service. The controller can identify the instances by generating a query to a metadata server, polling available instances, or from a data file cached in the controller. For example, the controller can be configured with or store a list of available instances of services in order to direct network traffic from the client. The controller can use a cloud API to receive metadata for each of the first instance of the first service, the second instance of the first service, the first instance of the second service, and the second instance of the second service. For example, the controller can generate one or more queries using the cloud API. The controller can determine, based on the metadata, a first edge weight for the first instance of the first service, a second edge weight for the second instance of the first service, a third edge weight for the first instance of the second service, and a fourth edge weight for the second instance of the second service. Edge weights can include or indicate an environmental weight for the instance. The weight can indicate a level of performance of the instance on the cloud. The weight can indicate a level of efficiency of the instance. The weight can indicate the level of efficiency of transmitting data from one instance to another instance in the service chain. The controller can generate a first path weight for the first path based on a combination of the first edge weight with the third edge weight. The controller can generate a second path weight for the second path based on a combination of the second edge weight with the fourth edge weight.

The controller can determine the weights based on account information for the instances and an attribute of the device. Account information for an instance or a virtual server of the instance can refer to metadata of a service to which the instance directs traffic. An attribute of the device can refer to an attribute of the appliance, intermediary device, instance, or load balancer. Attributes can include, for example, location, placement, capacity, number of active connections, memory, CPU usage, bandwidth, or network connectivity. The controller can determine a weight based on the attributes of the instance itself or a virtual server of the instance, as well as using account information for the instance (e.g., account information associated with backend servers to which the instance directs traffic).

In some embodiments, the controller can rank each service chain based on the path weight for each of the service chains. The controller can rank the service chains in ascending or descending order. The controller can select, based on the ranking, a predetermined number of highest ranking service chains of the plurality of service chains to generate a subset of service chains. The subset of service chains can refer to an optimal set of service chains or optimal service chains. These service chains may be optimal or best performing relative to the other available service chains that are configured to provide the same services of the cloud computing environment. For example, all the service chains can provide the same service or services, but each service chain may be different from another service chain because it includes at least one instance that is different than another service chain. For example, none of the service chains include all of the same instances as another service chain.

In some embodiments, the controller can analyze or parse the set of optimal service chains to determine that one or more instances that are available or provided by the computing infrastructure are not represented or included in the set of optimal service chains. Responsive to determining that there is at least one missing instance, the controller can determine the missing instance. The controller can then access the table storing the sorted list of service chains based on path weight to identify the next highest performing service chain that includes the missing service chain. The controller can add this additional service chain to the subset of optimal service chains. The controller can repeat this process until all the available instances are represented or included in the set of optimal service chains. Thus, the controller can modify the subset of service chains to include one or more additional service chains of the plurality of service chains, where the one or more additional service chains comprising the one or more missing instances of the service.

At step 790, the controller can select a service chain of the plurality of service chains to direct network traffic from a client. The controller can select the service chain based on a load balancing function and the path weight for each of the instances. For example, the controller can select the service chain corresponding to a highest path weight if higher weights indicate improved performance. In another example, higher weights may indicate decreased performance; thus, the controller may select the service chain corresponding to the lowest path weight. In some embodiments, the controller can use a weighted load balancing function, such as a weighted least connections function. The controller can input the selected optimal service chains into a load balancer or other identify or provide information on the selected optimal service chains to the load balancer to load balance the service chains responsive to request from a client or receiving traffic from a client.

In some embodiments, upon selecting the service chain based on the load balancing function and path weight, the controller can direct network from a client via the path of the selected service chain. The controller can encapsulate the traffic from the client with information identifying the instances in the path of the selected service chain. The controller can encapsulate the traffic with a label or other identifier of each of the instances in the path of the selected service chain. The controller can direct the traffic to the first instance in the selected service chain. The first instance may then direct the traffic to the second instance in the path of the selected service chain. The first instance can identify the second instance based on the encapsulated information. In some cases, the first instance can process the traffic and then forward the processed traffic to a router or switch, which can parse the encapsulated information and identify the second instance in the path of the selected service chain. In some cases, the encapsulated information can include or indicate an IP address for each of the instances in the path of the service chain.

Figure 8:
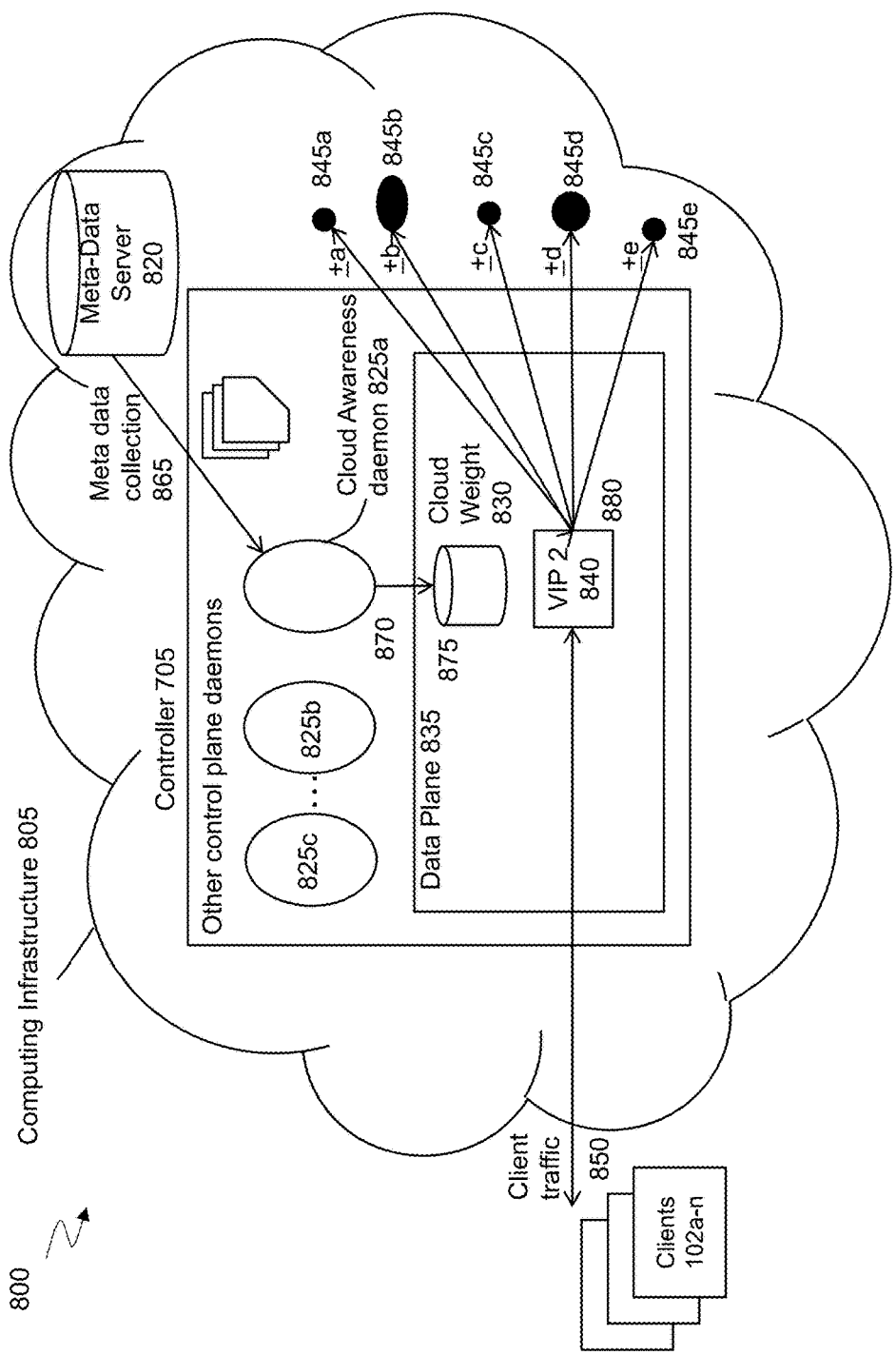
FIG. 8 is a functional block diagram of an embodiment of a system for load balancing service chains.

Referring now to FIG. 8, a functional block diagram of an embodiment of a system 800 for load balancing service chains is shown. The system 800 can be performed by one or more component or system depicted in FIG. 1-7A, or 9A-9C. The system 800 can include a computing infrastructure 805 or cloud environment 805. The computing infrastructure 805 can receive and transmit client traffic 850 from one or more clients 102*a-n* via a network (e.g., network 104). The computing infrastructure 805 can include, provide, or be associated with a controller 705, metadata server 820, and one or more services or servers 845*a-e*. The controller 705 can include one or more control plane daemons 825*a-c*. One or more of the control plane daemons can include a cloud awareness daemon 825*a*. The controller 705 can include a data plane 835. The data plane can include a VIP 2 840 (e.g., a vserver 275 configured to direct client traffic to one or more servers).

At step 865, the cloud awareness daemon 825*a* can fetch or retrieve meta-data from the meta-data server 820. At step 870, the cloud awareness daemon 825*a* can determine cloud weights for each instance using the received metadata. For example, the cloud weights for the VIP 2 840 instances can be a, b, c, d, and e. At step 875, the cloud awareness daemon 825*a* passes the cloud weights to the data plane 835. The controller 705 can then use the cloud weights to determine a path weight for each service chain provided by the computing infrastructure 805. At step 880, the controller 705 uses the path weights with one or more load balancing algorithms to select a service chain to direct traffic from the one or more clients 102a-n.

Figure 9A:
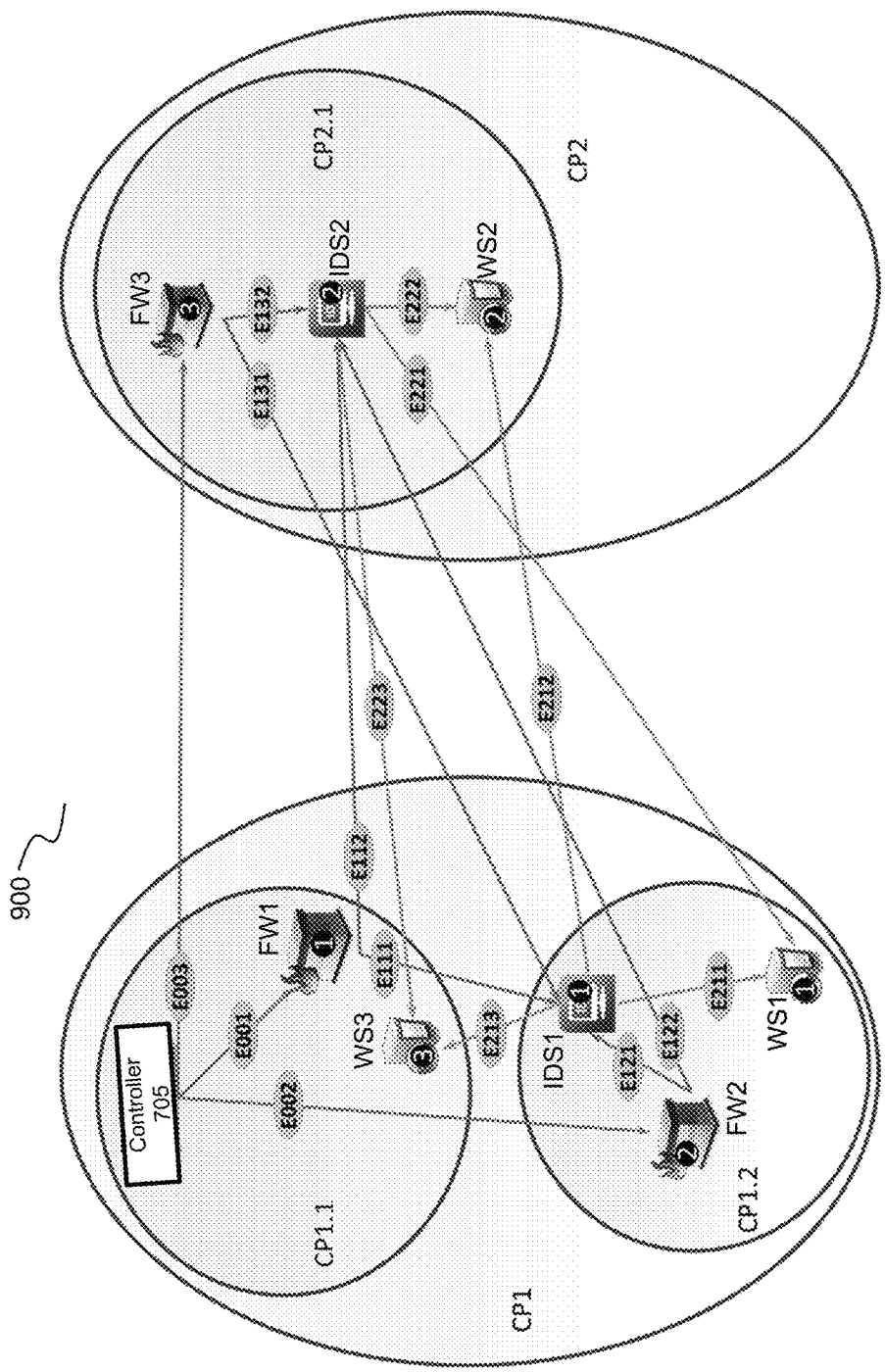
FIGS. 9A-9C are functional block diagrams of an embodiment of a system for load balancing service chains.

Referring now to FIG. 9A, a functional block diagrams of an embodiment of computing infrastructure 900 configured to load balance service chains is shown. The computing infrastructure 900 (or cloud environment 900) delivers services via service chains to one or more clients 102a-n. For example, and in some embodiments, the computing infrastructure 900 can be configured with a service chain that groups, links, or chains the following services together: firewall (FW) to intrusion detection system (IDS) to a web service (WS). The computing infrastructure can include multiple instances of each service as follows: three instances of the firewall service; two instances of the IDS service; and 3 instances of the web service. The controller can determine the total number of paths for the service chain based on the number of instances of each service chain as follows: 3 FW×2 IDS×3 WS=18 paths.

The instances of the services can execute in one or more zones or cloud partitions. For example, the computing infrastructure 900 can include a first cloud partition CP1 and a second cloud partition CP2. The first cloud partition CP1 can further include two sub-partitions CP1.1 and CP1.2. The second cloud partition CP2 can include a sub-partition CP2.1. The computing infrastructure 900 can execute one or more instances of the three different services on the cloud partitions as follows: a first instance of the firewall (FW1) can execute on CP1.1; a second instance of the firewall (FW2) can execute on CP1.2; a third instance of the firewall (FW3) can execute on CP2.1; a first instance of the intrusion detection system (IDS1) can execute on CP1.2; a second instance of the intrusion detection system (IDS2) can execute on CP2.1; a first instance of the web service (WS1) can execute on CP1.2; a second instance of the web service (WS2) can execute on CP2.1; and a third instance of the web service (WS3) can execute on CP1.1.

The controller 705 can receive metadata from an information repository for each of the instances to determine the location of the instances, capacity, processors, configuration, memory, network connection or other metadata or information that can facilitate determining a path weight based on a weight of each of the instances. The controller can determine the edge weight for each instance using the metadata received from the information repository. The controller can use the edge weights to determine the path weights as illustrated in Table 4.

TABLE 4

Path weight calculation

| No. | Path | Calculation | Path Weight |
|---|---|---|---|
| 01 | FW1→IDS1→WS1 | E001 + E111 + E211 | P1 |
| 02 | FW1→IDS1→WS2 | E001 + E111 + E212 | P2 |
| 03 | FW1→IDS1→WS3 | E001 + E111 + E213 | P3 |
| 04 | FW1→IDS2→WS1 | E001 + E112 + E221 | P4 |
| 05 | FW1→IDS2→WS2 | E001 + E112 + E222 | P5 |
| 06 | FW1→IDS2→WS3 | E001 + E112 + E223 | P6 |
| 07 | FW2→IDS1→WS1 | E002 + E121 + E211 | P7 |
| 08 | FW2→IDS1→WS2 | E002 + E121 + E212 | P8 |
| 09 | FW2→IDS1→WS3 | E002 + E121 + E213 | P9 |
| 10 | FW2→IDS2→WS1 | E002 + E122 + E221 | P10 |
| 11 | FW2→IDS2→WS2 | E002 + E122 + E222 | P11 |
| 12 | FW2→IDS2→WS3 | E002 + E122 + E223 | P12 |
| 13 | FW3→IDS1→WS1 | E003 + E131 + E211 | P13 |
| 14 | FW3→IDS1→WS2 | E003 + E131 + E212 | P14 |
| 15 | FW3→IDS1→WS3 | E003 + E131 + E213 | P15 |
| 16 | FW3→IDS2→WS1 | E003 + E132 + E221 | P16 |
| 17 | FW3→IDS2→WS2 | E003 + E132 + E222 | P17 |
| 18 | FW3→IDS2→WS3 | E003 + E132 + E223 | P18 |

The path weight illustrated in Table 4 can be determined using one or more path weight calculation techniques or algorithms. The controller can sort the path weights illustrated in Table 4 in ascending or descending order, depending on the weight assignment algorithm. For example, the controller can rank the path weights from most efficient to least efficient such that the highest ranking path weight corresponds to the most efficient service chain. In some cases, the controller can rank the path weights from least efficient to most efficient such that the lowest ranking path weight corresponds to the most efficient service chain. Table 5 illustrates the ranked or sorted path weights.

TABLE 5

Sorted table and selected optimal Paths

| Sorted No. | Path | Calculation | Path Weight |
|---|---|---|---|
| 01 | FW1→IDS1→WS1 | E001 + E111 + E211 | P1 |
| 02 | FW2→IDS1→WS1 | E002 + E121 + E211 | P7 |
| 03 | FW1→IDS1→WS3 | E001 + E111 + E213 | P3 |
| 04 | FW2→IDS1→WS3 | E002 + E121 + E213 | P9 |
| 05 | FW3→IDS2→WS2 | E003 + E132 + E222 | P17 |
| 06 | FW3→IDS1→WS1 | E003 + E131 + E211 | P13 |
| 07 | FW3→IDS1→WS3 | E003 + E131 + E213 | P15 |
| 08 | FW1→IDS1→WS2 | E001 + E111 + E212 | P2 |
| 09 | FW1→IDS2→WS1 | E001 + E112 + E221 | P4 |
| 10 | FW1→IDS2→WS2 | E001 + E112 + E222 | P5 |
| 11 | FW2→IDS1→WS2 | E002 + E121 + E212 | P8 |
| 12 | FW2→IDS2→WS3 | E002 + E122 + E223 | P12 |
| 13 | FW1→IDS2→WS3 | E001 + E112 + E223 | P6 |
| 14 | FW2→IDS2→WS1 | E002 + E122 + E221 | P10 |
| 15 | FW3→IDS1→WS2 | E003 + E131 + E212 | P14 |
| 16 | FW3→IDS2→WS3 | E003 + E132 + E223 | P18 |
| 17 | FW2→IDS2→WS2 | E002 + E122 + E222 | P11 |
| 18 | FW3→IDS2→WS1 | E003 + E132 + E221 | P16 |

The controller can select one or more optimal service chains or paths based on the sorted or ranked table shown in Table 5. The controller can select a predetermined number of highest ranking paths, where highest ranking can correspond to the most efficient or optimal paths. For example, the controller can select the top three entries of the sorted table as follows: P1: FW1→IDS1→WS1 (Optimal Path 1); P7: FW2→IDS1→WS1 (Optimal Path 2); P3: FW1→IDS1→WS3 (Optimal Path 3). The controller can use the paths indicated by the top three entries to process traffic more efficiently (e.g., low latency, less overhead, high throughput, low cost, etc.).

In some embodiments, the controller can analyze all 18 possible paths to select the highest ranking paths. In some embodiments, the controller can use a machine learning technique or pruning technique to select optimal paths without analyzing every possible paths. For example, the controller can determine that paths where at least two instances are not in the same data center zone or partition are less efficient, and filter those paths out Table 4 prior to creating the sorted Table 5.

In some embodiments, the controller can determine whether there are any instances provided by the computing infrastructure that are missing from the selected optimal paths and includes additional paths to cover all the instances. The controller can identify the missing instances and select an additional path such that all instances provided by the computing infrastructure are utilized by the controller to load balance service chain. For example, none of the three selected optimal paths 1, 2 or 3 include the instances FW3, IDS2 and WS2. The controller can then parse the sorted Table 3 to identify an additional optimal path that includes one or more of these instances. For example, the controller can select the highest ranking path that includes one or more of the missing instances as: P17: FW3→IDS2→WS2 (Optimal Path 4). In some cases, the controller can repeatedly parse the table to identify the highest ranking path that includes a missing instance until all the instances provided by the computing infrastructure are represented in the selected optimal paths.

Figure 9B:
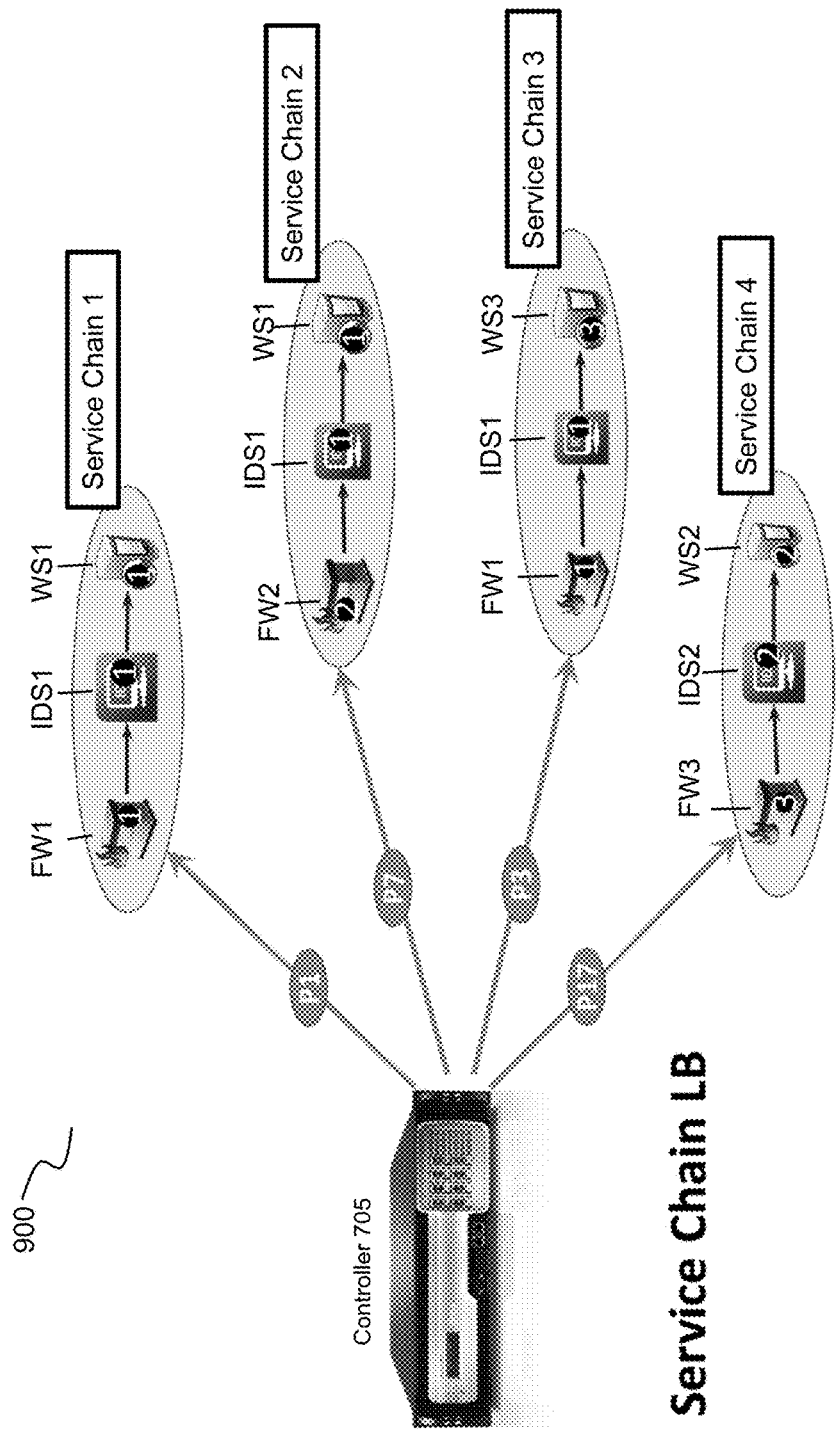

Referring now to FIG. 9B, a functional block diagrams of an embodiment of computing infrastructure 900 configured to load balance service chains is shown. The four optimal paths or service chains selected by the controller 705 are loaded into a load balancer algorithm. For example, the controller 705 can include a load balancer configured to receive the selected optimal paths along with corresponding paths weights. The selected optimal paths can include:

Service Chain 1 having instances FW1, IDS1 and WS1 and a path weight of P1;

Service Chain 2 having instances FW2, IDS1 and WS1 and a path weight of P7;

Service Chain 3 having instances FW1, IDS1 and WS3 and a path weight of P3; and

Service Chain 4 having instances FW3, IDS2 and WS2 and a path weight of P17.

The controller 705 can determine that these four service chains are the optimal service chains. When the controller 705 receives traffic from a client, the controller 705 can select a service chain from the four optimal service chains based on a load balancing function and the path weight of each of the four optimal service chains. The controller 705 can then directed the traffic from the client to the selected service chain or an instance of the selected the service chain. In some embodiments, the controller 705 can encapsulate the data packets of the traffic from the client with an indication, identifier or label of the instances of the service chain. For example, the controller can encapsulate the data packet with a multi-protocol labeling technique. The label can instruct components in the service chain to direct the packet to the subsequent nodes or instances in the service chain. The label can include an IP address or other identifier of the instances of the service chain. The instances can be configured to perform a lookup using the identifier to determine the IP address of the subsequent instance of the service chain, and then direct the data packet to the identified instance. In some embodiments, an interface or router can direct the data from one instance to the next instance based on the information encapsulating the data packet. For example, when the first instance processes the data packet, the first instance can encapsulate the packet to indicate that the first instance has processed the packet. A router or switch can parse the packet to determine that the first instance has already processed the packet, and that the packet is ready to be forwarded to the second instance identified by the encapsulation performed by the controller 705.

Figure 9C:
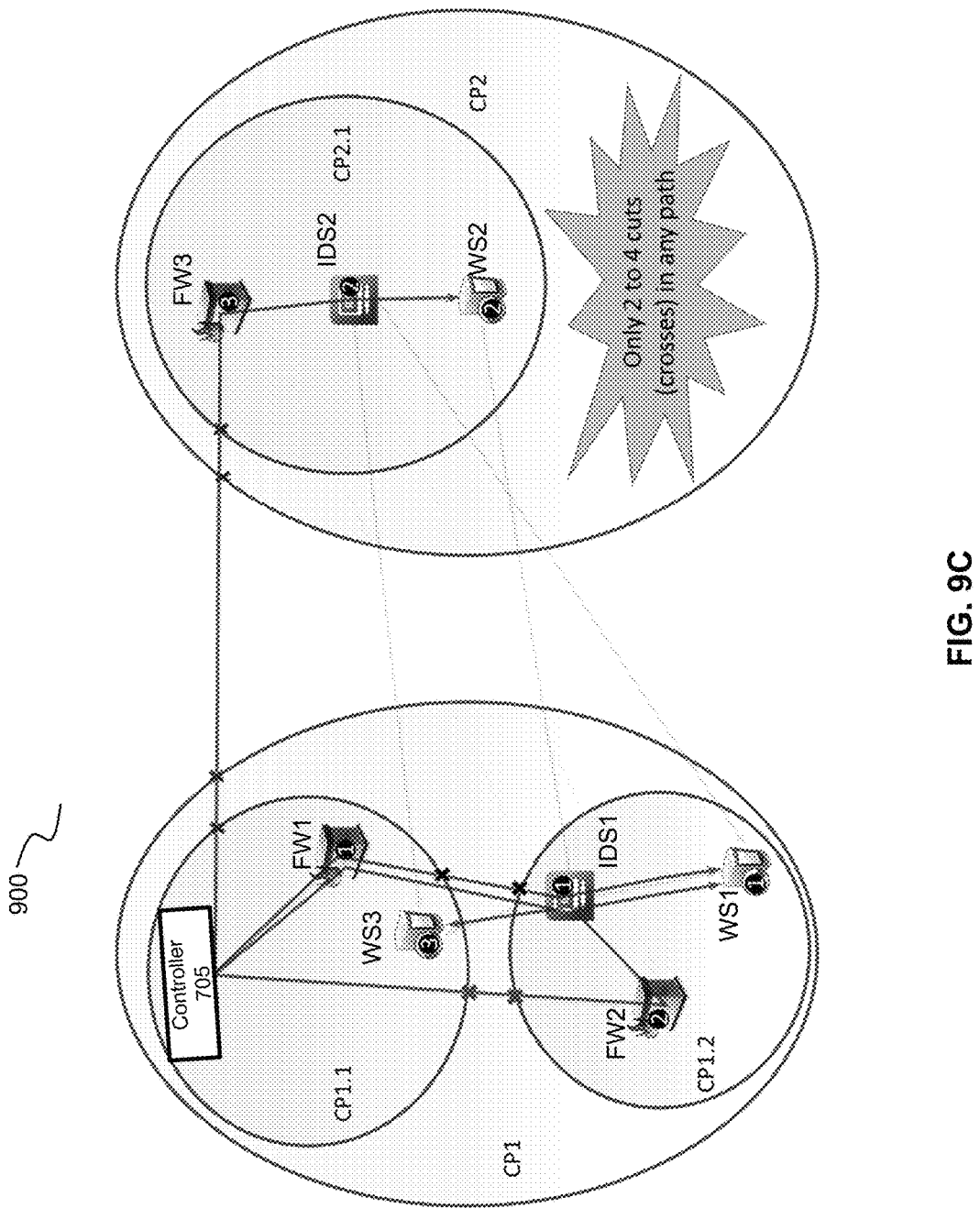

Referring now to FIG. 9C, a functional block diagrams of an embodiment of computing infrastructure 900 configured to load balance service chains is shown. FIG. 9C illustrates the four optimal service chains selected by the controller 705. By determining the optimal service chains, the controller 705 can reduce the number of crosses between a cloud partition or cloud sub-partition. As illustrated in FIG. 9C, the selected optimal paths range from 2 cross to 4 cross in any path. For example, Service Chain 1 has instances FW1, IDS1 and WS1. The controller 705 first directs the packet from client to FW1. This initial link does not require the packet to cross any cloud partition because both the controller 705 and FW1 are within the same cloud sub-partition CP1.1. Second, FW1 can forward the data packet to IDS1. This second link causes the packet to cross the boundaries of CP1.1 and CP1.2 to reach IDS1. Thus, the data packet when traversing the second link in the chain cross two partition boundaries. The IDS1 can then forward the data packet to WS1. IDS1 and WS1 are in the same sub-partition CP1.2, so the data does not cross any further boundaries. Thus, the service chain 1 has a path that crosses two partition boundaries. However, the path stays within the cloud partition CP1. Service chain 1 may have the highest path weight relative to the other 3 service chains because service chain one has only 2 crosses, the service chain stays within CP1, and the controller 705 and FW1 are in the same cloud sub-partition CP1.1.

Service Chain 2 has instances FW2, IDS1 and WS1. First, the controller 705 forwards data from the client to FW2. In this initial link, the data crosses CP1.1 to CP1.2, but stays within CP1. Thus, the first link in the path has 2 crosses. Second, the data traverses from FW2 to IDS1, which is within the same CP1.2 sub-partition. Third, the data traverses from IDS1 to WS1, which is within the same CP1.2 sub-partition. Thus, service chain 2 may have the second highest path weight because the path only has 2 crosses. This may be second highest because the controller 705 is in a different sub-partition than FW2.

Service Chain 3 has instances FW1, IDS1 and WS3. First, the controller 705 forwards a packet from the client to FW1. This initial link does not cross any boundaries and is enclosed in sub-partition CP1.1. Second, the data traverses from FW1 to IDS1 by going from sub-partition CP1.1 to sub-partition CP1.2. This leg of the path has two crosses, but stays within cloud partition CP1. Third, the data traverses from IDS1 to WS3 by going from CP1.2 to back to CP1.1. This leg of the path introduces two more crosses. Thus, service chain 3 includes 4 cuts or crosses through sub-partitions, but stays within the CP1 partition. This service chain may be the third highest performing service chain because it has 4 crosses, which is two more crosses than the higher performing service chains.

Service Chain 4 has instances FW3, IDS2 and WS2. First, the controller 705 forwards data received from the client to FW3 by traverses from CP1.1 to CP2.1. This leg of the path includes four crosses because the data crosses boundary of sub-partition CP1.1, boundary of partition CP1, boundary of partition CP2, and then boundary of sub-partition CP2.1. Second, the data goes from FW3 to IDS2. This leg of the path does not introduce any further crosses because both FW3 and IDS2 are located in cloud sub-partition CP2.1. Third, the data goes from IDS2 to WS2. This leg of the path does not introduce any further crosses because both IDS2 and WS2 are located in cloud sub-partition CP2.1. The path of this service chain includes four crosses. It may be the lowest performing service chain of the four selected optimal service chains because it includes four crosses, which is two more crosses than the top two performing service chains, and because the path crosses the high level cloud partitions CP1 to CP2. For example, CP1 and CP2 may be geographically dispersed, in different data centers, or different racks.

Figure 10:
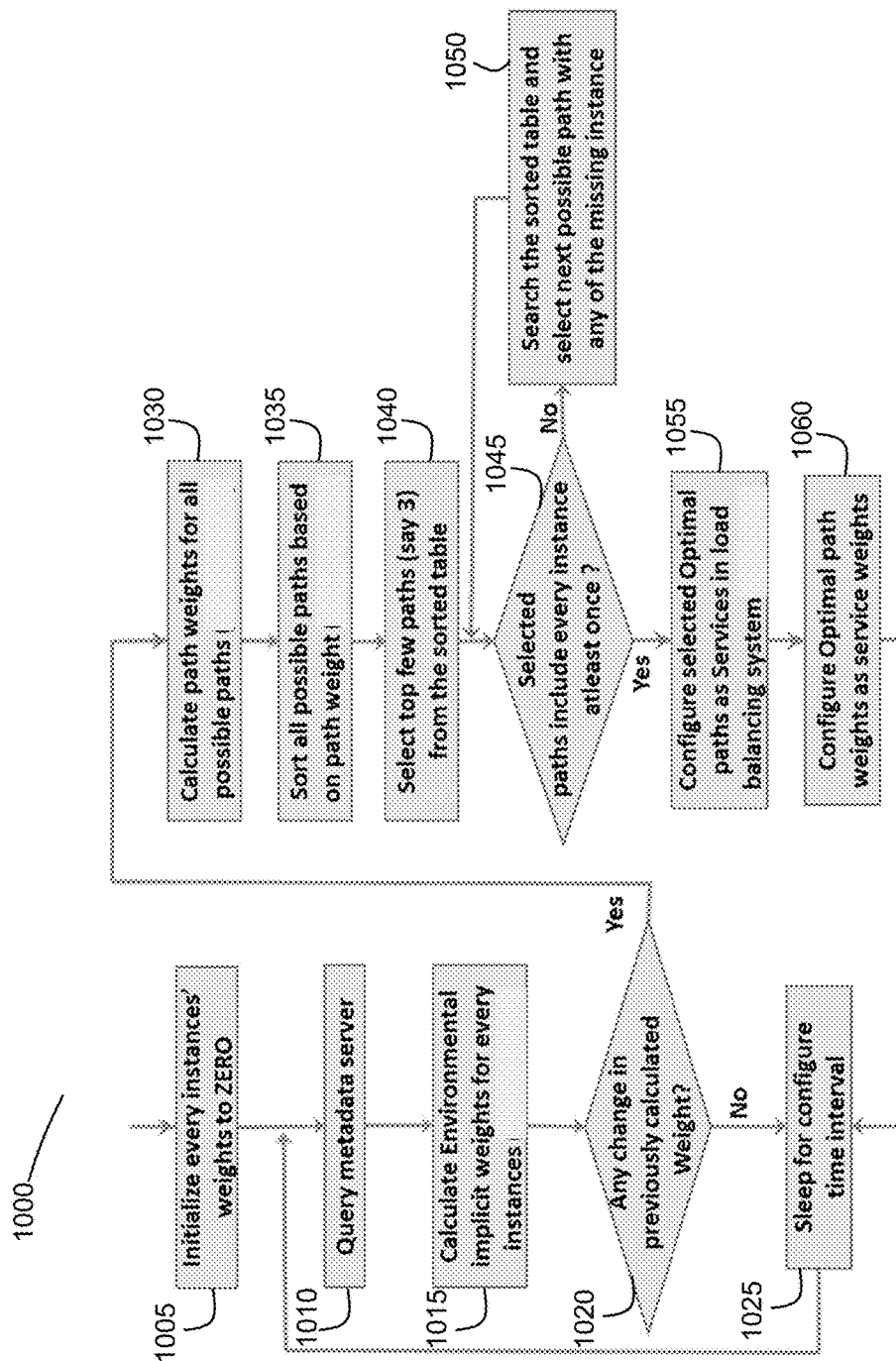
FIG. 10 is functional flow diagram of an embodiment load balancing service chains.

FIG. 10 is functional flow diagram of an embodiment load balancing service chains. The flow 1000 can be performed using one or more system or component described in FIG. 1-7A, 8, or 9A-9C. At step 1005 of the flow 1000, the controller initializes the weights of all of the instances provided by the computing infrastructure to zero or a default value (e.g., 0, 1, 2, 3, 4, or some other default value). At step 1010, the controller can generate one or more queries for a metadata server that has an information repository storing metadata about the instances provided by the computing infrastructure. The controller can transmit the request to the metadata server. In response to the request, the controller can receive metadata for each instance. At step 1015, the controller can calculate or determine environmental implicit weights for each instance. The weights can refer to edge weights or environmental weights for each instance.

At step 1020, the controller can compare the weights calculated for each instance at step 1015 with the weights previously determined for each of the instances. For example, the controller can store the previous values of the weights or historical weight values. The previous weight values for each instance may have been used to determine path weights for service chains comprising the instances. The controller can compare the new weights determined at step 1015 with the previous weights to determine if there is a difference in the weights. The difference in the weights can be responsive to new or updated metadata received from the metadata server at step 1010. If there is no difference in the weights, the controller can proceed to step 1025, at which point the controller can sleep or go into a standby mode for a predetermined time interval. Upon expiration of the predetermined time interval, the controller can proceed to step 1010 and query the metadata server again. The controller can repeat the cycle until the controller identifies a change to weight at step 1020.

If the controller determines that there is a change in a weight of any instance at step 1020 as compared to a previous weight of the same instance, the controller can proceed to step 1030. At step 1030, the controller can calculate path weights for all possible paths formed from the instances of the computing infrastructure. The controller can determine the path weight for each service chain by combining the environmental weights or edge weights of each instance of the service chain. At step 1035, the controller can sort the service chains based on the path weights such that the highest performing service chain is ranked or sorted as the top service chain. In some cases, the controller can sort the service chains in ascending order such that the last ranked service chain is the highest performing service chain based on the path weight.

At step 1040, the controller can select a predetermined number of top performing service chains from the sorted table, such as 3 service chains. At step 1045, the controller can parse the top 3 selected service chains to determine whether the selected service chains include every instance provided by the computing infrastructure at least one. If the controller determines that an instance provided by the computing infrastructure is missing from the selected service chains, the controller can proceed to step 1050. At step 1050, responsive to determining there is a missing instance, the controller can parse the sorted table to identify the next highest ranked service chain that includes a missing instance. The controller can add this additional instance to the set of selected instances. For example, if the set of selected instances initially included 3 service chains, the controller can add a fourth service chain to this set, where the fourth service chain includes a missing instance.

The controller can return to step 1045 to determine whether the set of four selected service chains include all the instances provided by the service chain at least one. The controller can repeat the process until the set of selected service chains include all of the instances provided by the cloud computing infrastructure.

At step 1055, responsive to determining that the selected service chains include all of the instances of services provided by the computing infrastructure, the controller can configured the selected optimal paths as service chains in a load balancing system. In some cases, the controller can include the load balancer. In some cases, the load balancer may be external to the controller, or executed by a different virtual machine than the controller. At step 1060, the controller can configure the load balancer to use the path weights of each service chain to load balance service chains. The controller or load balancer can then select a service chain from the selected optimal service chains based on a load balancing function and the path weights.

The controller can then proceed to step 1025 and go into a sleep or standby mode for a predetermined time interval (e.g., 5 seconds, 10 seconds, 30 seconds, 5 minutes, 10 minutes, 30 minutes, 1 hour, 2 hours, 3 hours, 6 hours, 12 hours, 24 hours, 48 hours, 72 hours, 1 week, or some other interval that facilitates load balancing service chains).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

References to "or" may be construed as inclusive so that any terms described using "or" may indicate any of a single, more than one, and all of the described terms.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method of load balancing service chains, comprising:
   identifying, by a controller intermediary to a client and computing infrastructure comprising one or more servers in one or more networked environments, a plurality of service chains from an indication of the plurality of chains received by the controller responsive to one or more queries generated by the controller using a cloud application programming interface, each of the plurality of service chains comprising a path having an instance of a first service provided by the computing infrastructure and an instance of a second service provided by the computing infrastructure;
   determining, by the controller, a path weight for each of the plurality of service chains, the path weight indicating a level of efficiency of delivering services in accordance with the service chain; and
   selecting, by the controller based on a load balancing function and the path weight for each of the plurality of service chains, a service chain from the plurality of service chains to direct network traffic from a client; and
   forwarding, by the controller, network traffic from the client to the selected service chain.

2. The method of claim 1, wherein identifying the plurality of service chains comprises:
   generating, by the controller using the cloud application programming interface, the one or more queries to identify each instance of the plurality of service chains; and
   receiving, by the controller responsive to the one or more queries, an indication of a first service chain comprising a first path having a first instance of the first service and a first instance of the second service, and an indication of a second service chain comprising a second path having a second instance of the first service and a second instance of the second service.

3. The method of claim 1, comprising:
   generating, by the controller using a cloud application programming interface, one or more queries to retrieve metadata for each instance of the plurality of service chains, the one or more queries configured to retrieve information for at least one of a placement, resource allocation, type of reservation, or type of connectivity.

4. The method of claim 1, comprising:
   identifying, by the controller, the service chain of the plurality of service chains comprising a first path having a first instance of the first service and a first instance of the second service;
   identifying, by the controller, a second service chain of the plurality of service chains comprising a second path having a second instance of the first service and a second instance of the second service;
   receiving, by the controller using a cloud application programming interface, metadata for each of the first instance of the first service, the second instance of the first service, the first instance of the second service, and the second instance of the second service;
   determining, by the controller based on the metadata, a first edge weight for the first instance of the first service, a second edge weight for the second instance of the first service, a third edge weight for the first instance of the second service, and a fourth edge weight for the second instance of the second service;
   generating, by the controller, a first path weight for the first path based on a combination of the first edge weight with the third edge weight;
   generating, by the controller, a second path weight for the second path based on a combination of the second edge weight with the fourth edge weight; and
   selecting, by the controller, the service chain corresponding to the first path based on the first path weight ranking higher than the second path weight.

5. The method of claim 1, wherein selecting the service chain comprises:
   ranking, by the controller, each service chain of the plurality of service chains based on the path weight for each of the plurality of service chains;
   selecting, by the controller based on the ranking, a predetermined number of highest ranking service chains of the plurality of service chains to generate a subset of service chains; and
   inputting, by the controller, the path weight for each of the subset of service chains into the load balancing function to select the service chain.

6. The method of claim 1, comprising:
   ranking, by the controller, each service chain of the plurality of service chains based on the path weight for each of the plurality of service chains;
   selecting, by the controller based on the ranking, a predetermined number of highest ranking service chains of the plurality of service chains to generate a subset of service chains;
   identifying, by the controller, one or more instances of the first service that are missing from the subset of service chains; and
   modifying, by the controller, the subset of service chains to include one or more additional service chains of the plurality of service chains, the one or more additional service chains comprising the one or more instances of the first service.

7. The method of claim 1, comprising:
   pruning, by the controller using a machine learning technique, the plurality of service chains to generate a subset of the plurality of service chains; and
   selecting, by the controller based on the load balancing function and the path weight for each of the subset of the plurality of service chains, the service chain from the subset of the plurality of service chains.

8. The method of claim 1, comprising:
   determining the path weight for each of the plurality of service chains based on an edge weight of each instance of each of the plurality of service chains, the path weight based on at least one of latency, resource overhead, throughput, or resource cost.

9. The method of claim 1, wherein each of the plurality of service chains comprise a different path and provide same services.

10. A system to load balance service chains, comprising:
a controller comprising at least one hardware processor intermediary to a client and computing infrastructure comprising one or more servers in one or more networked environments configured to:
identify a plurality of service chains from an indication of the plurality of chains received by the controller responsive to one or more queries generated by the controller using a cloud application programming interface, each of the plurality of service chains comprising a path having an instance of a first service provided by the computing infrastructure and an instance of a second service provided by the computing infrastructure;
determine a path weight for each of the plurality of service chains, the path weight indicating a level of efficiency of delivering services in accordance with the service chain; and
select, based on a load balancing function and the path weight for each of the plurality of service chains, a service chain from the plurality of service chains to direct network traffic from a client; and
forward network traffic from the client to the selected service chain.

11. The system of claim 10, wherein the controller is further configured to:
generate, based on using the cloud application programming interface, the one or more queries to identify each instance of the plurality of service chains; and
receive, responsive to the one or more queries, an indication of a first service chain comprising a first path having a first instance of the first service and a first instance of the second service, and an indication of a second service chain comprising a second path having a second instance of the first service and a second instance of the second service.

12. The system of claim 10, wherein the controller is further configured to:
generate, based on a cloud application programming interface, one or more queries to retrieve metadata for each instance of the plurality of service chains, the one or more queries configured to retrieve information for at least one of a placement, resource allocation, type of reservation, or type of connectivity.

13. The system of claim 10, wherein the controller is further configured to:
identify the service chain of the plurality of service chains comprising a first path having a first instance of the first service and a first instance of the second service;
identify a second service chain of the plurality of service chains comprising a second path having a second instance of the first service and a second instance of the second service;
receive, via a cloud application programming interface, metadata for each of the first instance of the first service, the second instance of the first service, the first instance of the second service, and the second instance of the second service;
determine, based on the metadata, a first edge weight for the first instance of the first service, a second edge weight for the second instance of the first service, a third edge weight for the first instance of the second service, and a fourth edge weight for the second instance of the second service;
generate a first path weight for the first path based on a combination of the first edge weight with the third edge weight;
generate a second path weight for the second path based on a combination of the second edge weight with the fourth edge weight; and
select the service chain corresponding to the first path based on the first path weight ranking higher than the second path weight.

14. The system of claim 10, wherein the controller is further configured to:
rank each service chain of the plurality of service chains based on the path weight for each of the plurality of service chains;
select, based on the rank, a predetermined number of highest ranking service chains of the plurality of service chains to generate a subset of service chains; and
input the path weight for each of the subset of service chains into the load balancing function to select the service chain.

15. The system of claim 10, wherein the controller is further configured to:
rank each service chain of the plurality of service chains based on the path weight for each of the plurality of service chains;
select, based on the rank, a predetermined number of highest ranking service chains of the plurality of service chains to generate a subset of service chains;
identify one or more instances of the first service that are missing from the subset of service chains; and
modify the subset of service chains to include one or more additional service chains of the plurality of service chains, the one or more additional service chains comprising the one or more instances of the first service.

16. The system of claim 10, wherein the controller is further configured to:
prune, based on a machine learning technique, the plurality of service chains to generate a subset of the plurality of service chains; and
select, based on the load balancing function and the path weight for each of the subset of the plurality of service chains, the service chain from the subset of the plurality of service chains.

17. The system of claim 10, wherein the controller is further configured to:
determine the path weight for each of the plurality of service chains based on an edge weight of each instance of each of the plurality of service chains, the path weight based on at least one of latency, resource overhead, throughput, or resource cost.

18. The system of claim 10, wherein each of the plurality of service chains comprise a different path and provide same services.

* * * * *